(12) United States Patent
Hori

(10) Patent No.: US 8,879,164 B2
(45) Date of Patent: Nov. 4, 2014

(54) ZOOM LENS AND IMAGE PICKUP APPARATUS HAVING THE SAME

(71) Applicant: Canon Kabushiki Kaisha, Tokyo (JP)

(72) Inventor: Masao Hori, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 6 days.

(21) Appl. No.: 13/859,293

(22) Filed: Apr. 9, 2013

(65) Prior Publication Data

US 2013/0271849 A1 Oct. 17, 2013

(30) Foreign Application Priority Data

Apr. 13, 2012 (JP) ................... 2012-092310

(51) Int. Cl.
*G02B 15/14* (2006.01)

(52) U.S. Cl.
USPC ........... 359/687; 359/683; 359/684; 359/685; 359/686; 359/715; 359/740; 359/774

(58) Field of Classification Search
USPC .......................... 359/683–687, 715, 740, 774
See application file for complete search history.

(56) References Cited

U.S. PATENT DOCUMENTS

| | | | | | |
|---|---|---|---|---|---|
| 5,737,128 | A * | 4/1998 | Usui | ............................. | 359/686 |
| 7,885,014 | B2 * | 2/2011 | Inomoto et al. | ............... | 359/688 |
| 2004/0070844 | A1 | 4/2004 | Sato | | |
| 2008/0144188 | A1 * | 6/2008 | Hamano | ....................... | 359/683 |
| 2009/0034091 | A1 * | 2/2009 | Sakamoto | ...................... | 359/687 |
| 2009/0296231 | A1 * | 12/2009 | Shirasuna | ..................... | 359/687 |
| 2010/0194969 | A1 * | 8/2010 | Sakamoto | ...................... | 359/686 |
| 2010/0302649 | A1 * | 12/2010 | Yoshimi et al. | ............... | 359/686 |
| 2011/0037878 | A1 * | 2/2011 | Wakazono et al. | ........... | 359/683 |
| 2012/0127587 | A1 * | 5/2012 | Yakita | ........................... | 359/687 |
| 2012/0134031 | A1 * | 5/2012 | Eguchi et al. | .................. | 359/686 |
| 2012/0200940 | A1 * | 8/2012 | Ohmoto | ....................... | 359/683 |
| 2012/0218645 | A1 * | 8/2012 | Yoshimi | ....................... | 359/686 |
| 2013/0271849 | A1 | 10/2013 | Hori | | |

FOREIGN PATENT DOCUMENTS

| | | |
|---|---|---|
| JP | 63008619 A | 1/1988 |
| JP | 6242378 A | 9/1994 |
| JP | 2003-344766 A | 12/2003 |

OTHER PUBLICATIONS

EESR issued Jun. 26, 2013 for corres. EP 13001821.1.

* cited by examiner

*Primary Examiner* — Evelyn A. Lester
(74) *Attorney, Agent, or Firm* — Rossi, Kimms & McDowell LLP

(57) ABSTRACT

A zoom lens includes, in order from an object side to an image side: a positive first lens unit; a negative second lens unit; a positive third lens unit; and a positive fourth lens unit, wherein the first lens unit includes a positive first lens subunit, which does not move for focusing, a positive second lens subunit, which moves during the focus adjustment, and a positive third lens subunit, which does not move for focusing; and focal lengths of the first lens unit, the second lens unit, the third lens unit, a magnification of the third lens unit U3 at a wide angle end, focal lengths of the first lens subunit, the second lens subunit appropriately satisfy certain relations.

11 Claims, 12 Drawing Sheets

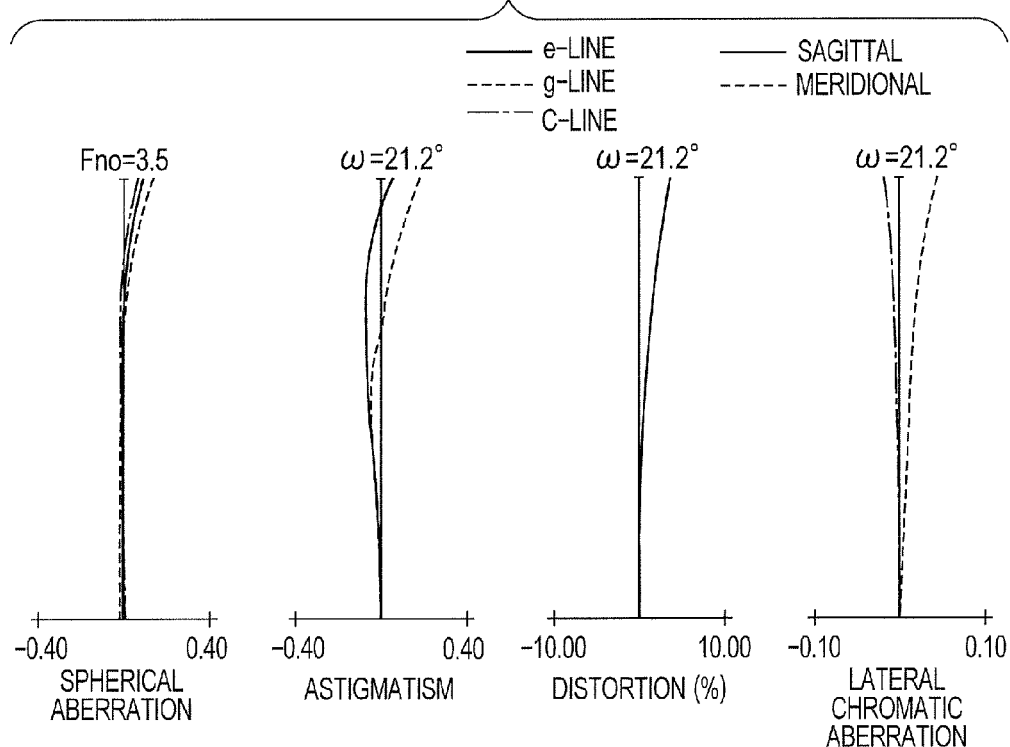
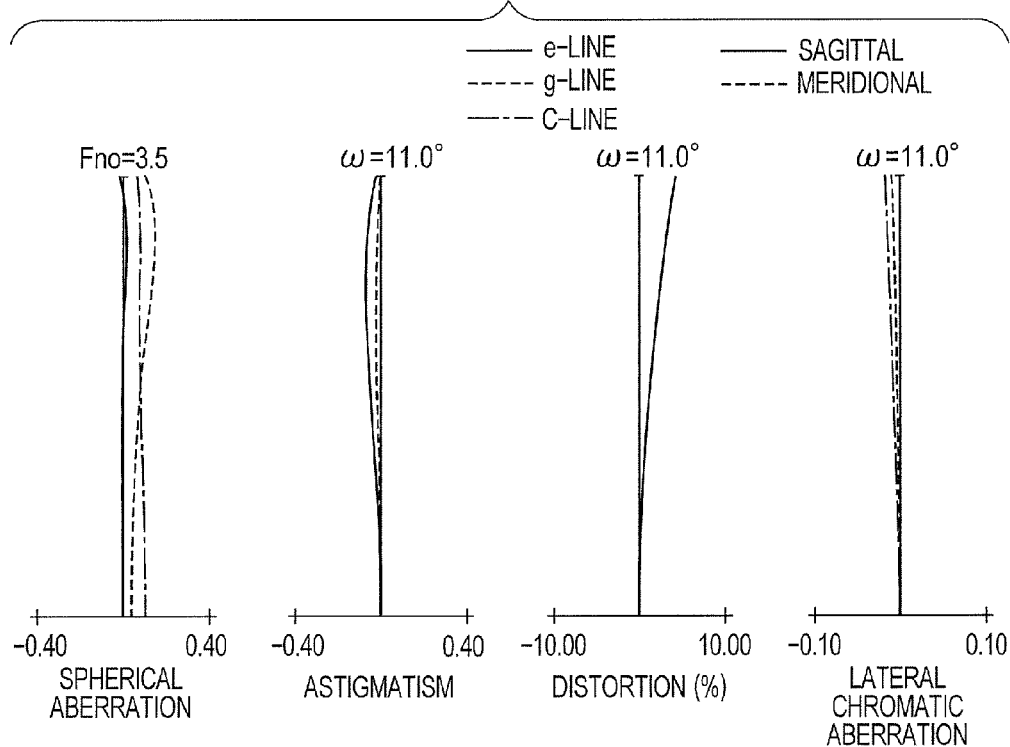

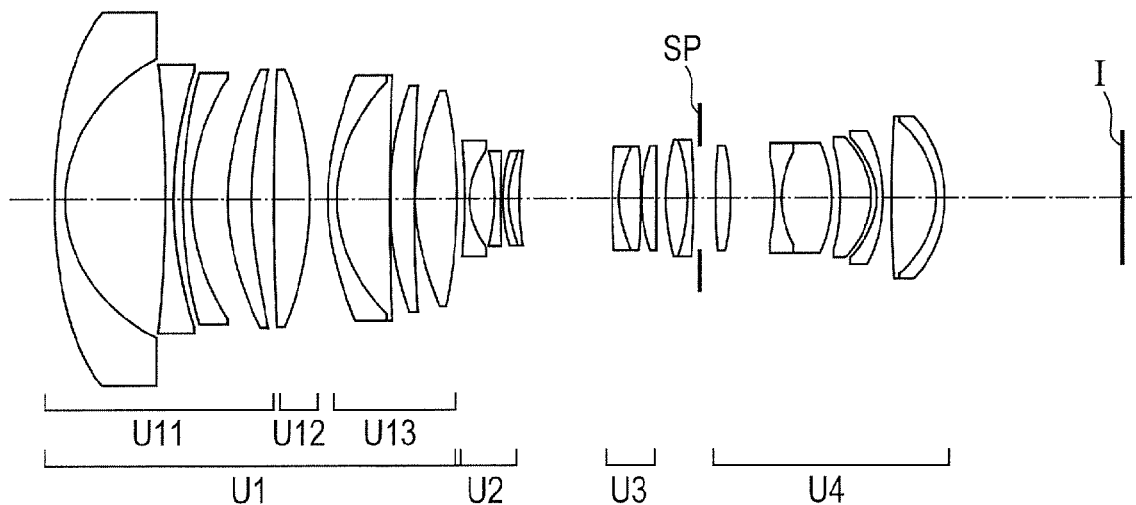
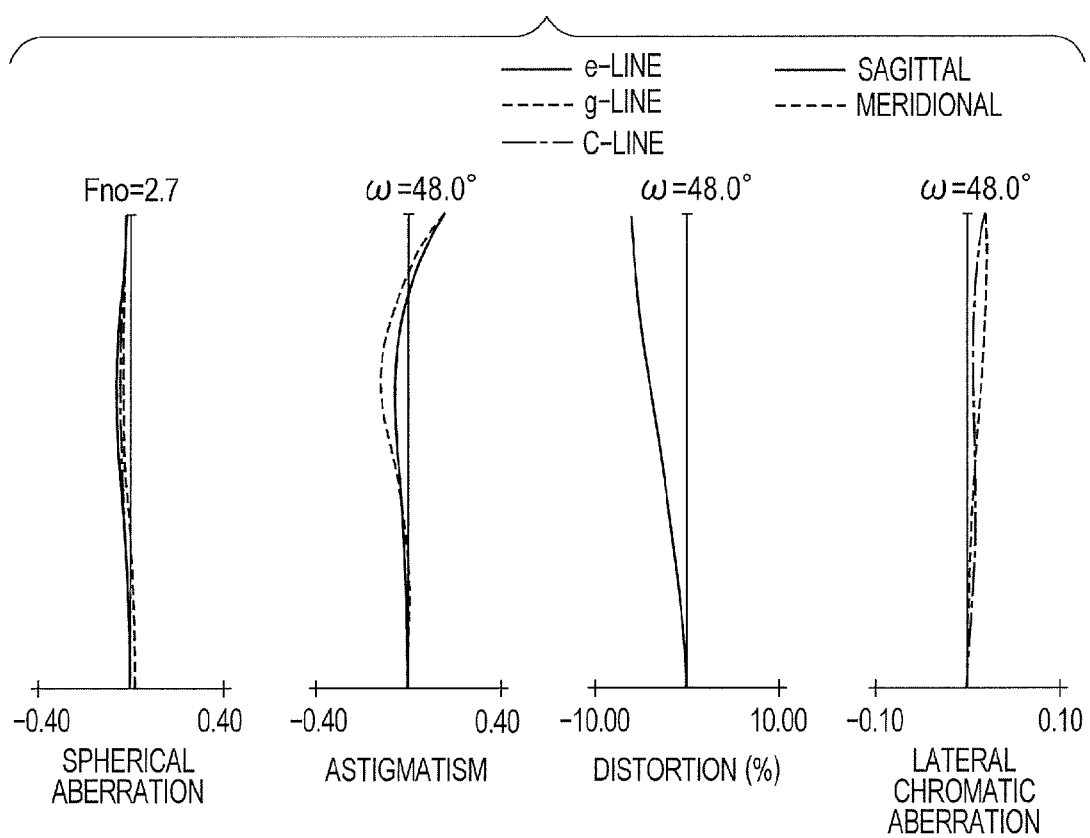

ically control a principal point of the first lens unit, when the angle is further widened, and it is difficult to avoid upsizing of a lens diameter. In addition, in the configuration of focus units as in Japanese Patent Application Laid-Open No. S63-8619, it is difficult to adequately correct the variation of aberration and the variation in the angle of field occurring when an object distance has varied.

ZOOM LENS AND IMAGE PICKUP APPARATUS HAVING THE SAME

BACKGROUND OF THE INVENTION

1. Field of the Invention

The present invention relates to a zoom lens and an image pickup apparatus having the same, and particularly relates to a broadcasting television camera, a cinema camera, a video camera, a digital still camera, a silver halide film camera and the like.

2. Description of the Related Art

An image pickup apparatus such as a broadcasting television camera, a cinema camera, a silver halide film camera, a digital camera and a video camera has been conventionally desired to be provided with a zoom lens which has a reduced size and weight, a high zoom ratio, and besides, an adequate optical performance. Particularly, an imaging device such as CCD and CMOS which are used in a television/cinema camera of a moving image photographing system for professionals has an almost uniform resolving power over the whole imaging range. Because of this, the zoom lens to be used in this system is required to have an almost uniform resolving power from the center to the periphery of the screen. In addition, reduction in size and weight is also required for an imaging form in which mobility and operability are regarded as important.

Particularly, as a zoom lens which is also excellent in photographing for a wide angle of field, there is a positive-lead type four-unit zoom lens which arranges a first lens unit that has positive refractive power and is used for focusing, in the side closest to the object side, and includes four lens units as a whole.

Japanese Patent Application Laid-Open No. H06-242378 discloses a zoom lens which has a first lens unit including three units having negative refractive power, positive refractive power and positive refractive power, respectively, and includes four units as a whole having positive refractive power, negative refractive power, negative refractive power and positive refractive power, respectively, or having positive refractive power, negative refractive power, positive refractive power and positive refractive power, respectively, from the side closest to the object side. Japanese Patent Application Laid-Open No. S63-008619 discloses a zoom lens which has a first lens unit including three units having negative refractive power, positive refractive power and positive refractive power, respectively, and four units as a whole having positive refractive power, negative refractive power, positive refractive power and positive refractive power, respectively, sequentially from the object side.

However, in a conventional technology disclosed in Japanese Patent Application Laid-Open No. H06-242378, it is difficult to further widen the angle of the zoom lens and further reduce the size and weight thereof at the same time. A zoom lens which has lens units having negative refractive power arranged in a side closer to the object side than a stop, as in Embodiment 1 or 2 in Japanese Patent Application Laid-Open No. H06-242378, is disadvantageous to the widening of the angle of the zoom lens and reduction in the size and weight thereof, because it is difficult to suppress the diameter of a lens unit existing in an image side of the second lens unit and the first lens unit. Embodiment 3 in Japanese Patent Application Laid-Open No. H06-242378 discloses a technology in which a third lens unit has positive refractive power. However, in the Embodiment 3, the third lens unit has a strong refractive power, and accordingly the number of constituting lenses increases. Embodiment 3 also results in having no other choice but to increase the number of lenses constituting the fourth lens unit in order to secure a sufficient F-number and an exit pupil for a strong convergence light emitted from the third lens unit, and as a result, the zoom lens is disadvantageous to the reduction in the size and weight.

On the other hand, the configuration of the first lens unit of the above described zoom lens disclosed in Japanese Patent Application Laid-Open No. S63-008619 cannot appropri-

SUMMARY OF THE INVENTION

Then, an object of the present invention is to provide a zoom lens which widens the angle, has high magnification and reduces the size and the weight at the same time, and besides, can attain an adequate optical performance.

In order to achieve the above described objects, a zoom lens of the present invention includes, sequentially from an object side: a first lens unit having positive refractive power, which does not move for zooming; a second lens unit having negative refractive power, which moves during zooming; a third lens unit having positive refractive power, which moves during zooming; and a fourth lens unit having positive refractive power, which does not move for zooming, wherein the first lens unit includes from the object side, a first lens subunit having negative refractive power, which does not move for focusing, a second lens subunit having positive refractive power, which moves during the focus adjustment, and a third lens subunit having positive refractive power, which does not move for focusing; the third lens unit forms such a trajectory as to move to an image side when the zoom lens zooms to a telephoto end from a wide angle end and then move to the object side; and when a focal length of the first lens unit is represented by f1, a focal length of the second lens unit is represented by f2, a focal length of the third lens unit is represented by f3, an imaging magnification at the wide angle end of the third lens unit is represented by $\beta 3w$, a focal length of the first lens subunit is represented by f11 and a focal length of the second lens subunit is represented by f12, the values satisfy the following expressions:

$$-2.2 < f1/f2 < -0.8,$$

$$-0.7 < 1/\beta 3w < 0.5,$$

$$-0.55 < f2/f3 < -0.25, \text{ and}$$

$$-6.0 < f12/f11 < -2.5.$$

The present invention can provide a zoom lens which widens the angle, has high magnification and reduces the size and the weight at the same time, and besides, can attain an adequate optical performance.

Further features of the present invention will become apparent from the following description of embodiments with reference to the attached drawings.

BRIEF DESCRIPTION OF THE DRAWINGS

FIG. 4B illustrates views of aberration when focusing on infinity at the middle zoom position in Numerical Embodiment 2.

FIG. 4C illustrates views of aberration when focusing on infinity at the telephoto end in Numerical Embodiment 2.

FIG. 5 illustrates a sectional view of lenses when focusing on infinity at the wide angle end in Numerical Embodiment 3.

FIG. 6A illustrates views of aberration when focusing on infinity at the wide angle end in Numerical Embodiment 3.

DESCRIPTION OF THE EMBODIMENTS

Preferred embodiments of the present invention will now be described in detail in accordance with the accompanying drawings.

Figure 1:
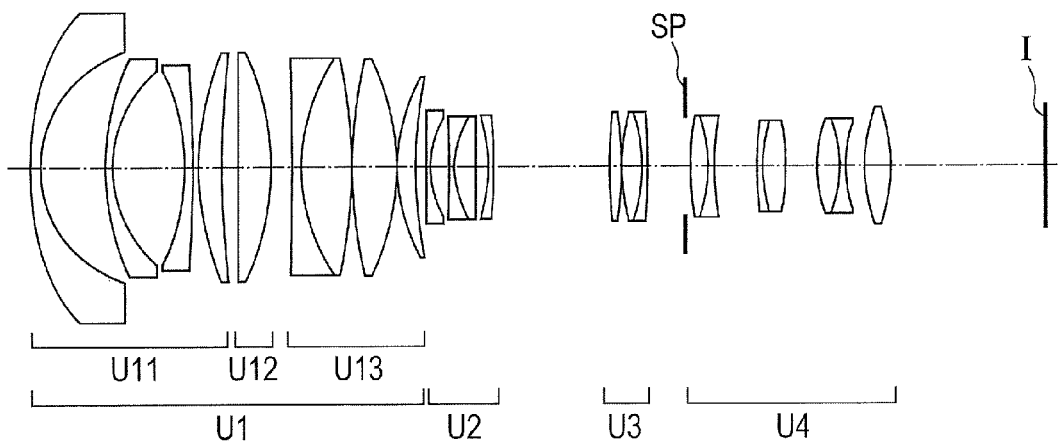
FIG. 1 illustrates a sectional view of lenses when focusing on infinity at a wide angle end in Numerical Embodiment 1.
Figure 2A:
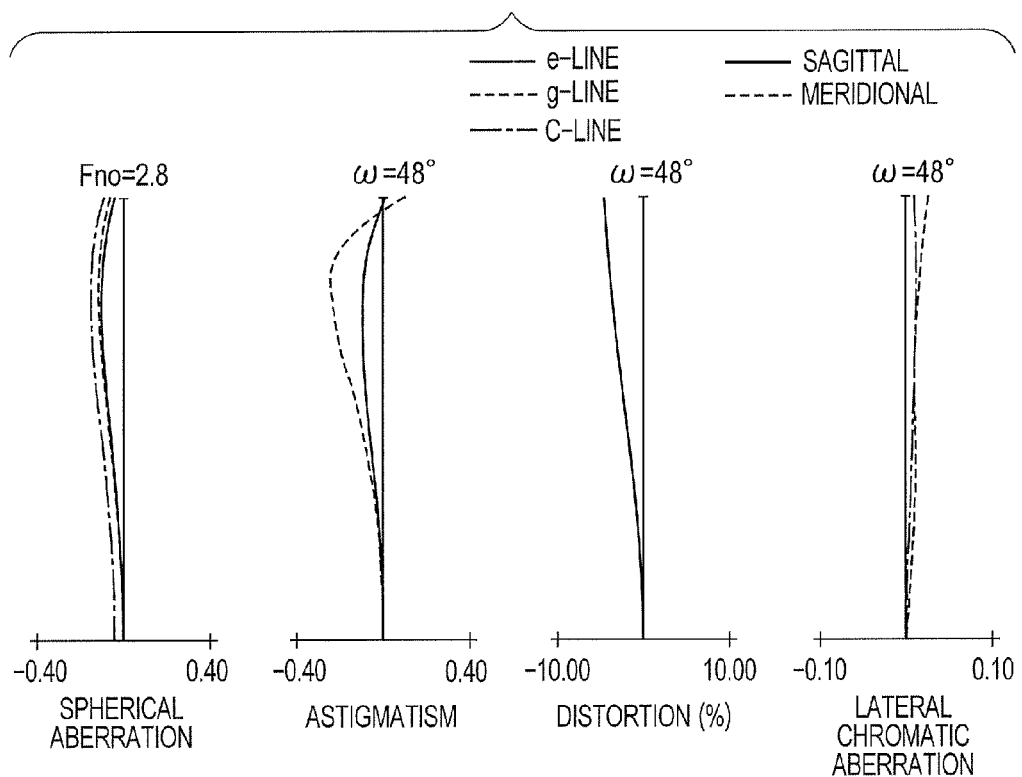
FIG. 2A illustrates views of aberration when focusing on infinity at the wide angle end in Numerical Embodiment 1.
Figure 2B:
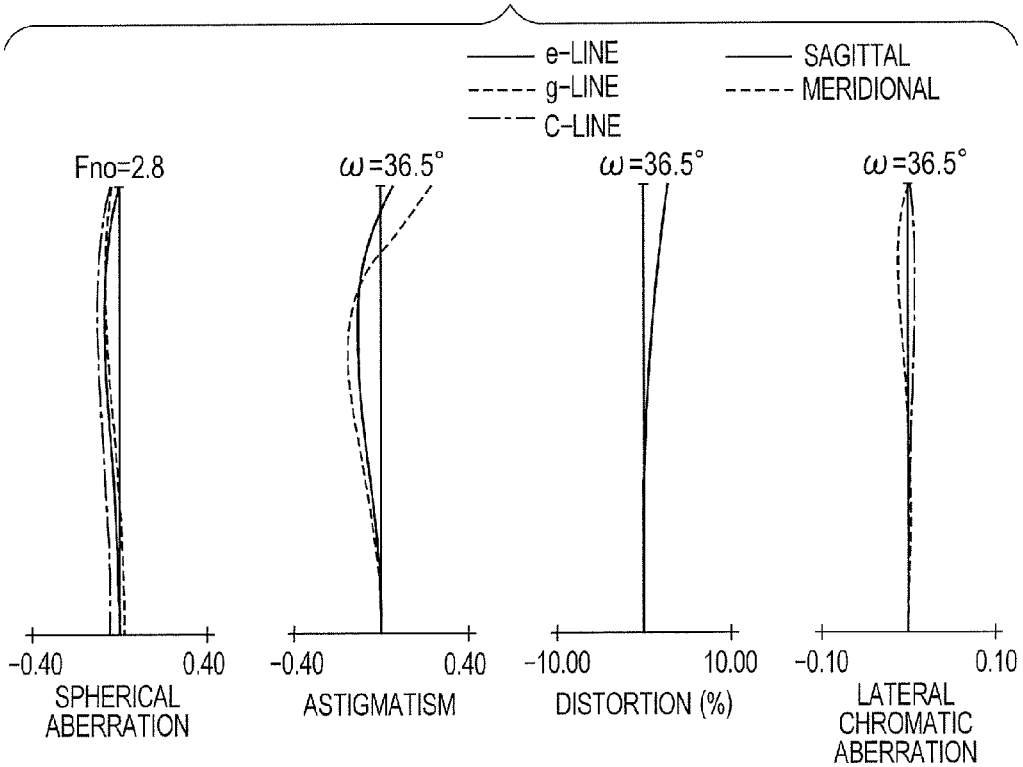
FIG. 2B illustrates views of aberration when focusing on infinity at the middle zoom position in Numerical Embodiment 1.
Figure 2C:
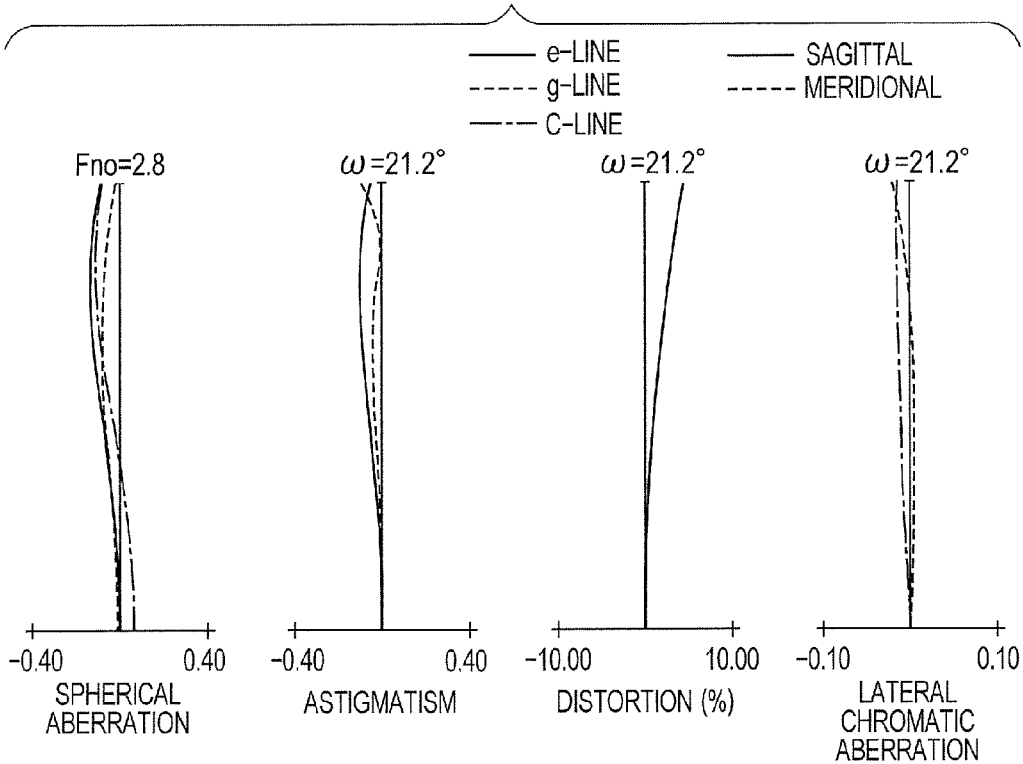
FIG. 2C illustrates views of aberration when focusing on infinity at a telephoto end in Numerical Embodiment 1.

FIG. 1 is a sectional view of lenses when focusing on infinity at a wide angle end (short focal length end, focal length f=14 mm) in Embodiment 1 (Numerical Embodiment 1) of the present invention. FIGS. 2A, 2B and 2C are views of aberration when focusing on infinity at the wide angle end, at the middle (focal length f=21 mm) and at a telephoto end (long focal length end, focal length f=40 mm), respectively, in Numerical Embodiment 1. The focal length and the object distance are values in the numerical Embodiments, which are expressed in units of mm. The condition is the same in all of the following exemplary embodiments.

Figure 3:
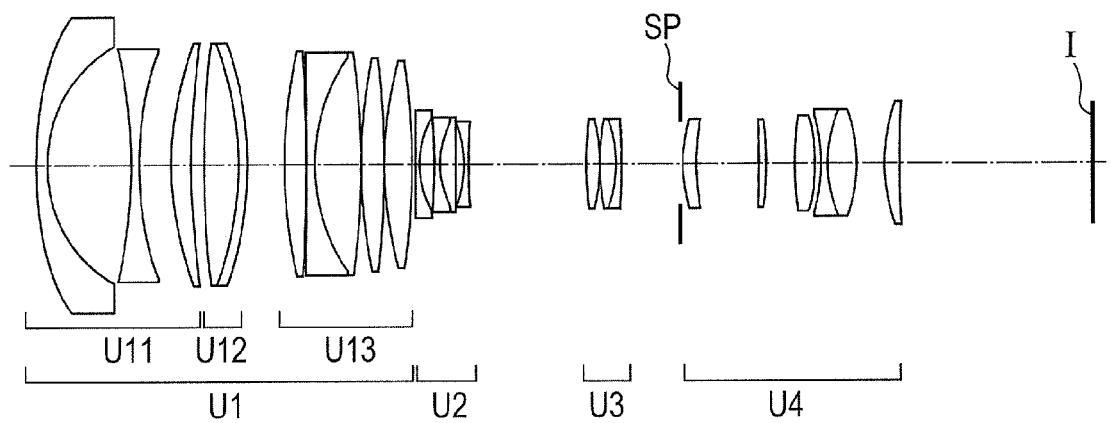
FIG. 3 illustrates a sectional view of lenses when focusing on infinity at the wide angle end in Numerical Embodiment 2.
Figure 4A:
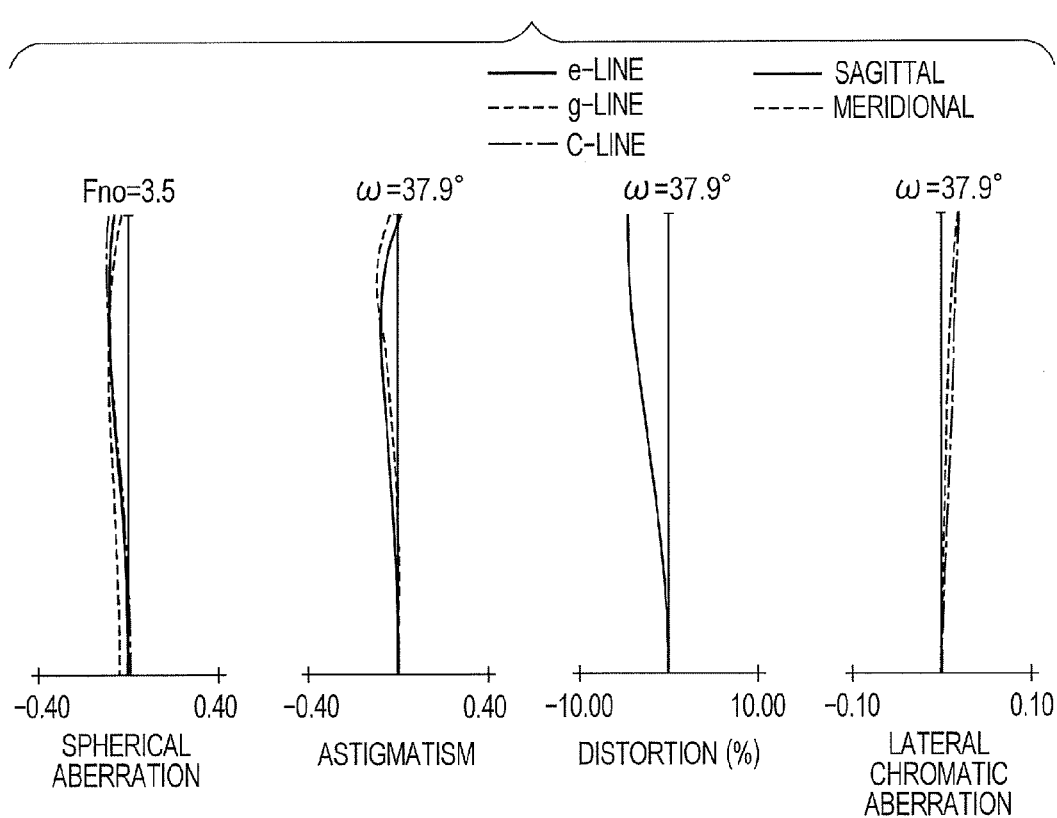
FIG. 4A illustrates views of aberration when focusing on infinity at the wide angle end in Numerical Embodiment 2.

FIG. 3 is a sectional view of lenses when focusing on infinity at the wide angle end (short focal length end, focal length f=20 mm) in Embodiment 2 (Numerical Embodiment 2) of the present invention. FIGS. 4A, 4B and 4C are views of aberration when focusing on infinity at the wide angle end, at the middle (focal length f=40 mm) and at the telephoto end (long focal length end, focal length f=80 mm), respectively, in Numerical. Embodiment 2.

Figure 6B:
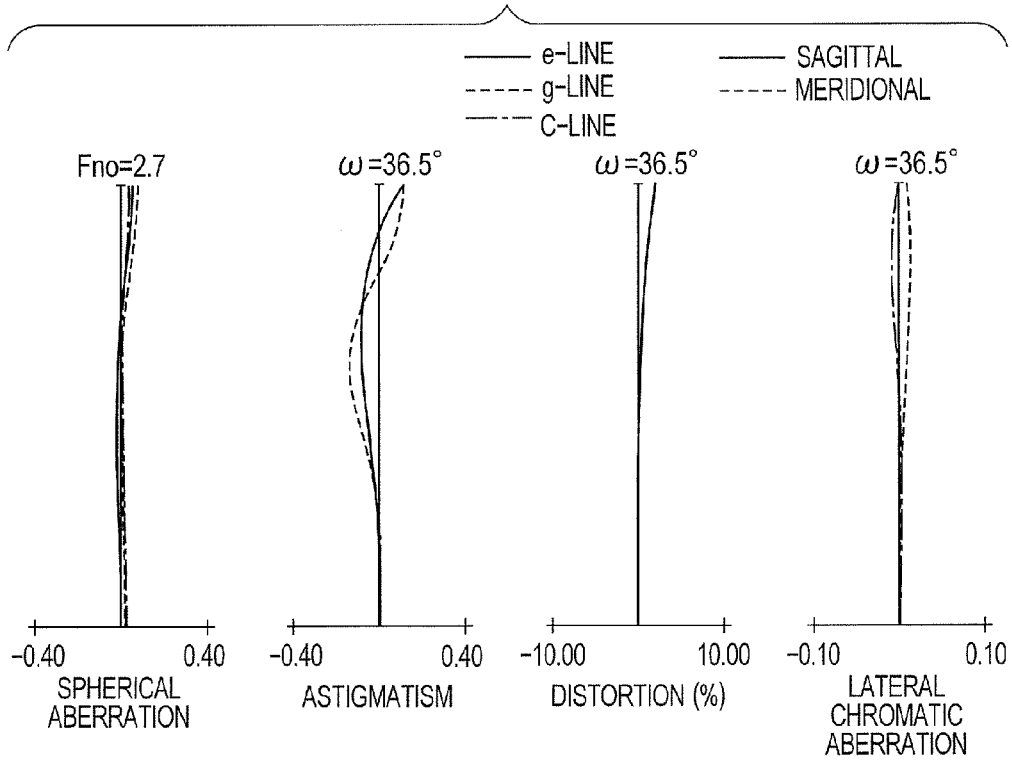
FIG. 6B illustrates views of aberration when focusing on infinity at the middle zoom position in Numerical Embodiment 3.
Figure 6C:
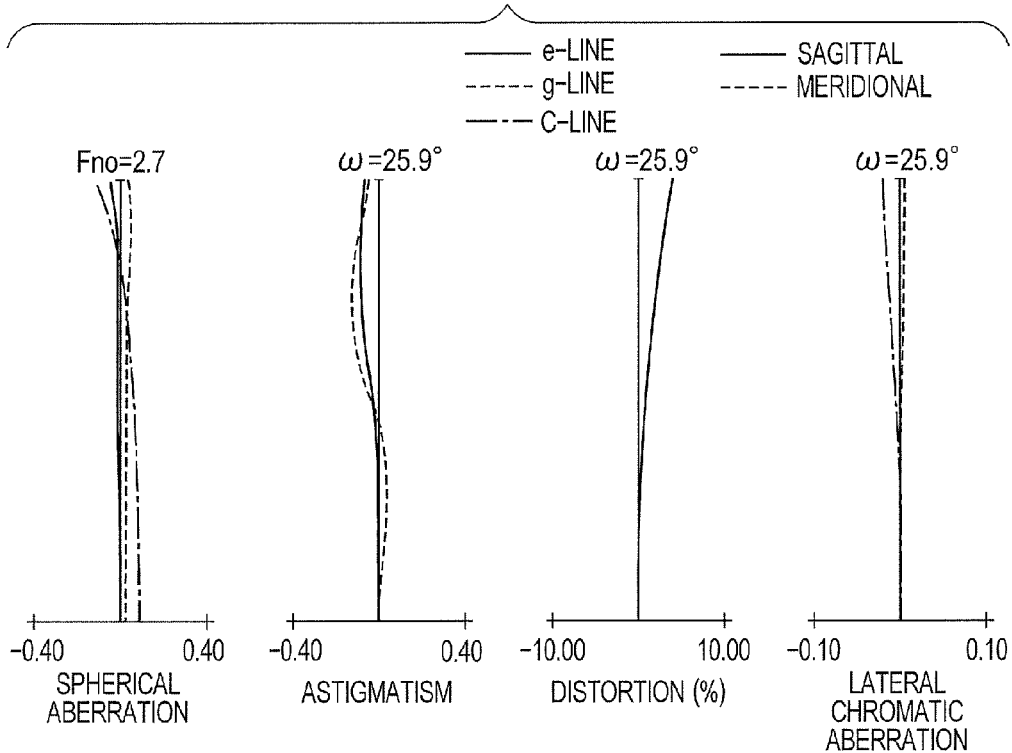
FIG. 6C illustrates views of aberration when focusing on infinity at the telephoto end in Numerical Embodiment 3.

FIG. 5 is a sectional view of lenses when focusing on infinity at the wide angle end (short focal length end, focal length f=14 mm), in Embodiment 3 (Numerical Embodiment 3) of the present invention. FIGS. 6A, 6B and 6C are views of aberration when focusing on infinity at the wide angle end, at the middle (focal length f=21 mm) and at a telephoto end (long focal length end, focal length f=32 mm), respectively, in Numerical Embodiment 3.

Figure 7:
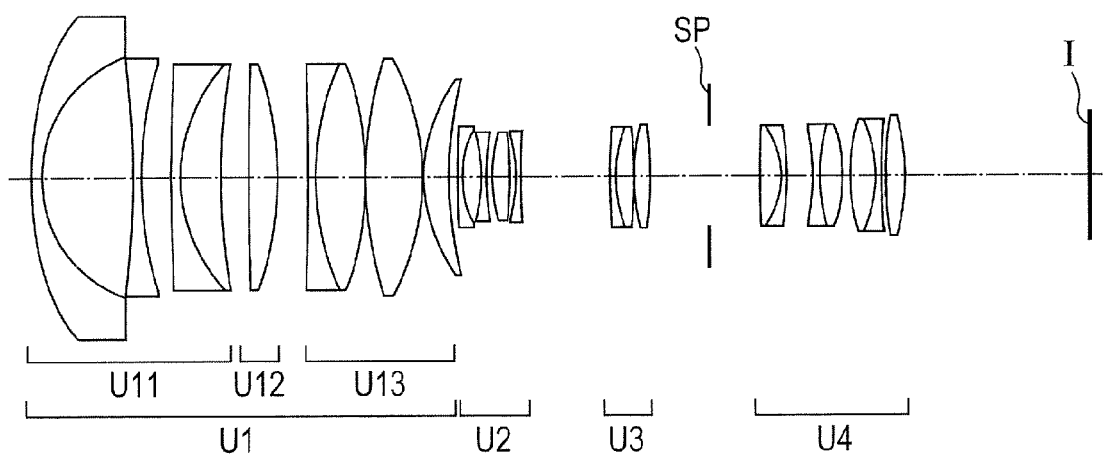
FIG. 7 illustrates a sectional view of lenses when focusing on infinity at the wide angle end in Numerical Embodiment 4.
Figure 8A:
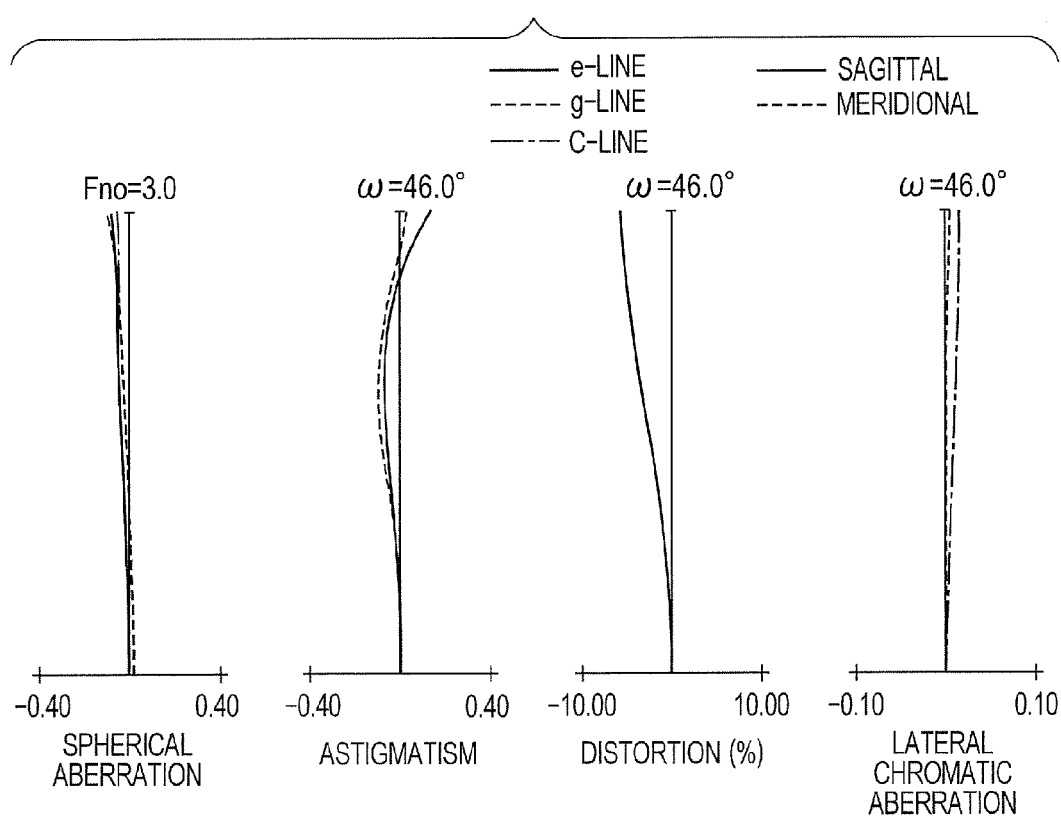
FIG. 8A illustrates views of aberration when focusing on infinity at the wide angle end in Numerical Embodiment 4.
Figure 8B:
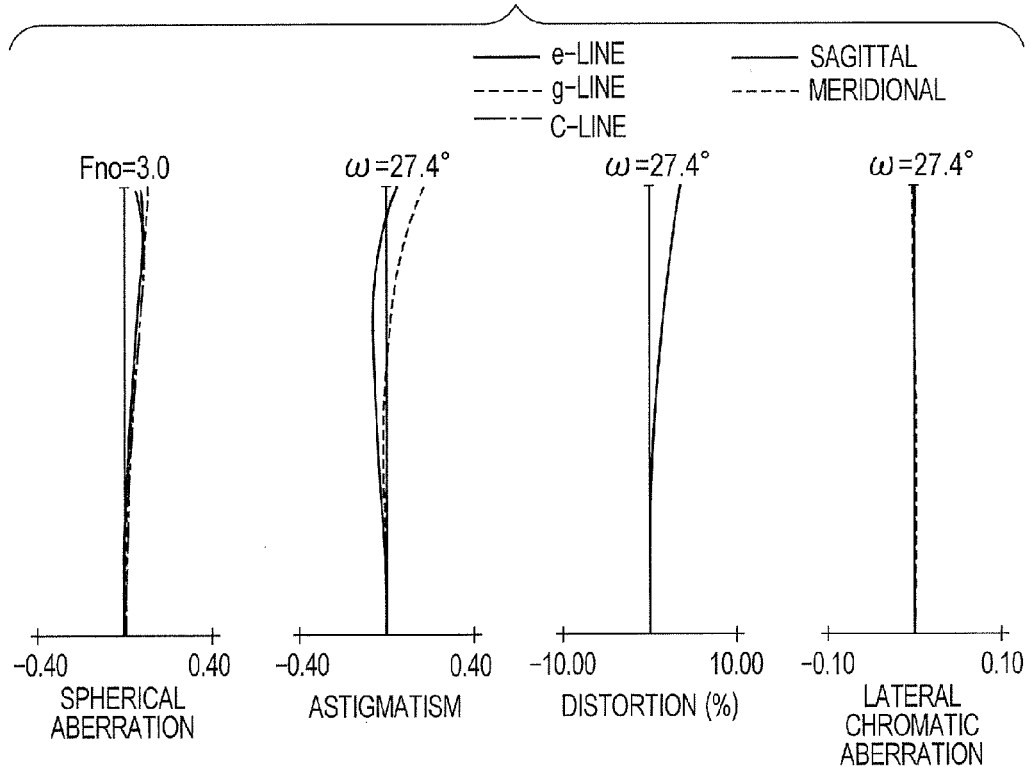
FIG. 8B illustrates views of aberration when focusing on infinity at the middle zoom position in Numerical Embodiment 4.
Figure 8C:
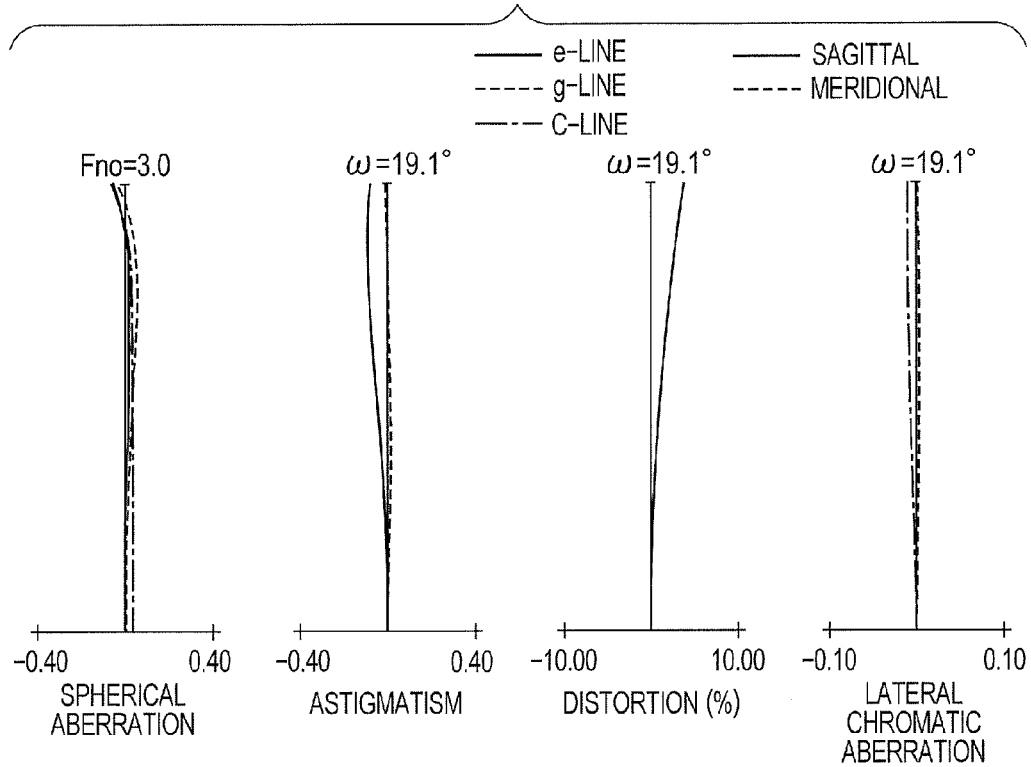
FIG. 8C illustrates views of aberration when focusing on infinity at the telephoto end in Numerical Embodiment 4.

FIG. 7 is a sectional view of lenses when focusing on infinity at the wide angle end (short focal length end, focal length f=15 mm), in Embodiment 4 (Numerical Embodiment 4) of the present invention. FIGS. 8A, 8B and 8C are views of aberration when focusing on infinity at the wide angle end, at the middle (focal length f=30 mm) and at the telephoto end (long focal length end, focal length f=45 mm), respectively, in Numerical Embodiment 4.

Figure 9:
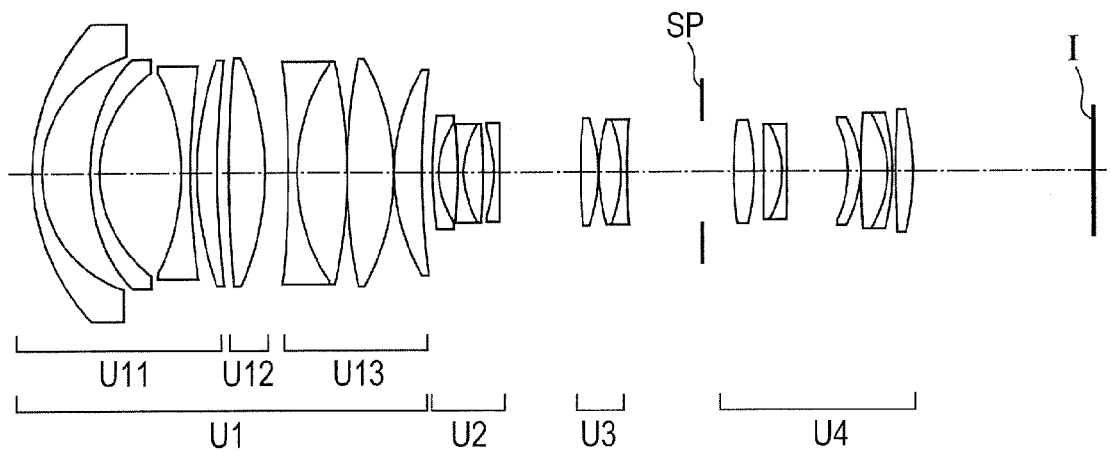
FIG. 9 illustrates a sectional view of lenses when focusing on infinity at the wide angle end in Numerical Embodiment 5.
Figure 10A:
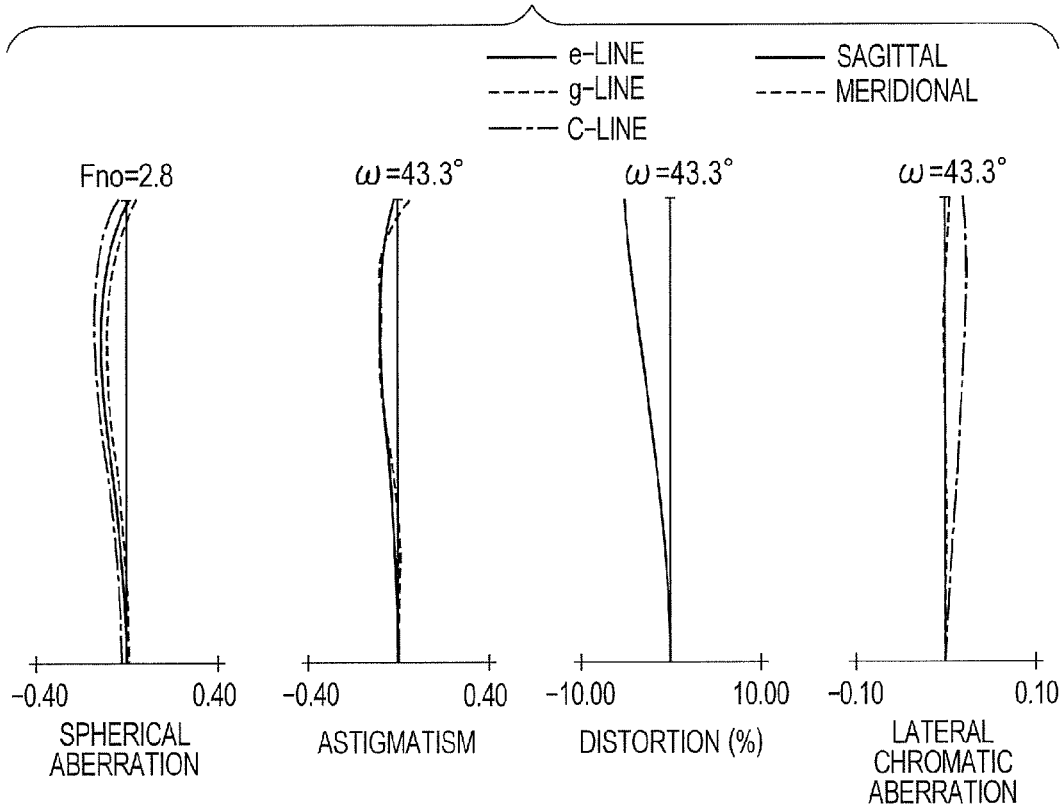
FIG. 10A illustrates views of aberration when focusing on infinity at the wide angle end in Numerical Embodiment 5.
Figure 10B:
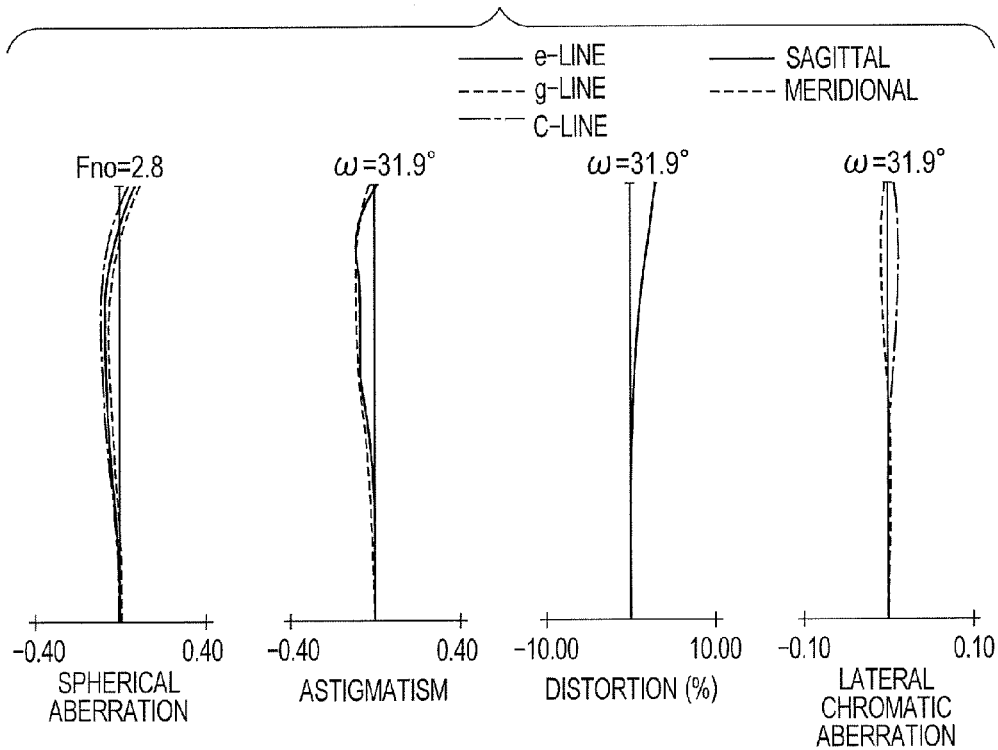
FIG. 10B illustrates views of aberration when focusing on infinity at the middle zoom position in Numerical Embodiment 5.
Figure 10C:
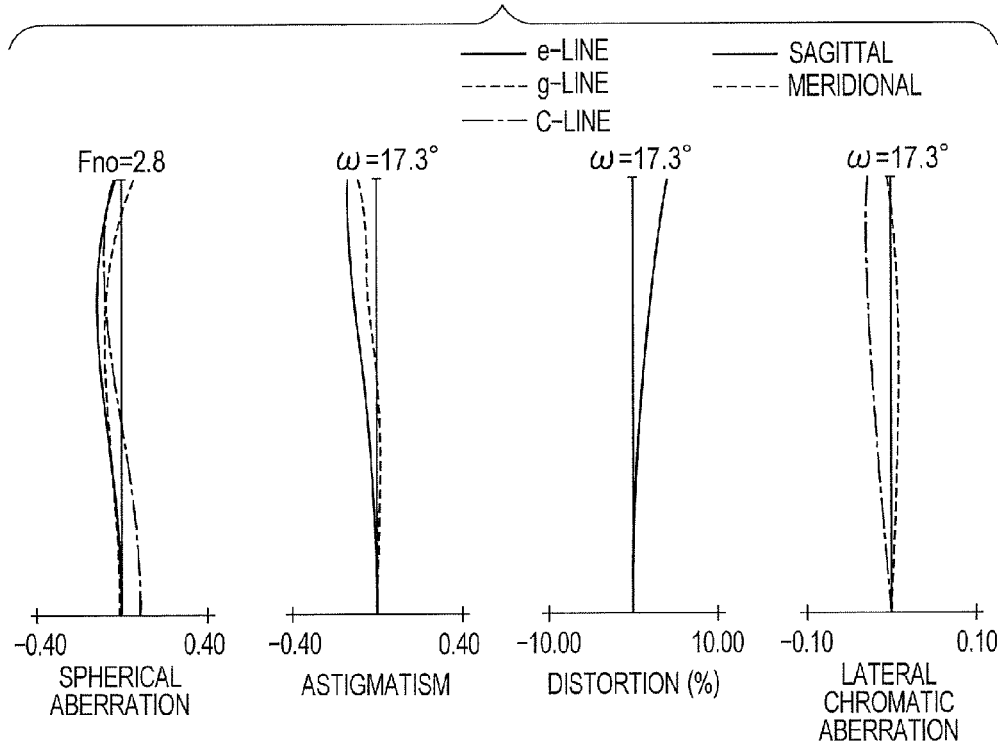
FIG. 10C illustrates views of aberration when focusing on infinity at a telephoto end in Numerical Embodiment 5.

FIG. 9 is a sectional view of lenses when focusing on infinity at the wide angle end (short focal length end, focal length f=16.5 mm), in Embodiment 5 (Numerical Embodiment 5) of the present invention. FIGS. 10A, 10B and 10C are views of aberration when focusing on infinity at the wide angle end, at the middle (focal length f=25 mm) and at a telephoto end (long focal length end, focal length f=50 mm), respectively, in Numerical. Embodiment 5.

In each of the sectional views of the lenses, the left side is an object (subject) side, and the right side is an image side. In the sectional view of the lens, U1 represents a first lens unit having positive refractive power, which includes a lens unit for focusing. U11 represents a first lens subunit having negative refractive power, which does not move for focusing. U12 represents a second lens subunit having positive refractive power, which moves in an optical axis direction during the focus adjustment. U13 represents a third lens subunit having positive refractive power, which does not move for focusing. Incidentally, in the following each exemplary embodiment, the second lens subunit U12 moves to the image side end from the object side end in the optical axis direction in a movable range fox the mechanism, when focusing to a proximity end side from an infinite side.

U2 represents a second lens unit having negative refractive power, which includes a lens unit for zooming, and changes the magnification to the telephoto end from the wide angle end, by monotonically moving the lens unit to the image side in the optical axis direction. U3 represents a third lens unit having positive refractive power, which corrects the image plane variation due to the varying magnification, non-linearly moves toward the image side in the optical axis direction, passes through a position closest to the image side out of middle positions of the varying magnification, and then non-linearly moves to the object side, when varying magnification to the telephoto end from the wide angle end. The second lens unit U2 and the third lens unit U3 constitute a varying magnification optical system.

SP represents a stop (aperture stop). U4 represents a fourth lens unit for imaging, which has positive refractive power and does not move for varying magnification. I represents an image plane, and corresponds to an image pickup plane of a solid-state image pickup element (photoelectric transducer) which receives light of an image formed by the zoom lens and converts the light signal to an electric signal.

In each of the previously described embodiments, reduction in the size and weight of a wide angle zoom lens is attained which acquires a zoom ratio of approximately 2 to 5 times and a half angle of field of 37 degrees or more at the wide angle end, while having an adequate optical performance.

In a view of longitudinal aberration, the spherical aberration is represented by an e-line (solid line), a g-line (dotted line) and a C-line (dashed line). The astigmatism is represented by a meridional image plane (dotted line) and a sagittal image plane (solid line) of the e-line. The lateral chromatic aberration is represented by the g-line (dotted line) and the C-line (dashed line). Fno represents an F-number, and ω represents a half angle of field. In the view of the longitudinal aberration, the spherical aberration is drawn with a scale of 0.4 mm, the astigmatism is drawn with a scale of 0.4 mm, the distortion is drawn with a scale of 10%, and the lateral chromatic aberration is drawn with a scale of 0.1 mm. Incidentally, in each of the following embodiments, the wide angle end and the telephoto end mean zoom positions at both ends of such a range that the second unit U2 for varying magnification is mechanically movable in the optical axis direction, respectively.

The zoom lens of the present invention includes four lens units as a whole, which include sequentially from the object side to the image side: a first lens unit having positive refractive power; a second lens unit having negative refractive power; a third lens unit having positive refractive power; and a fourth lens unit having positive refractive power. Furthermore, the first lens unit includes: a first lens subunit having negative refractive power, which does not move for focusing; a second lens subunit having positive refractive power, which moves in an optical axis direction during focusing; and a third lens subunit having positive refractive power, which does not move for focusing.

When a focal length of the first lens unit U1 is represented by f1, a focal length of the second lens unit U2 is represented by f2, a focal length of the third lens unit U3 is represented by f3, a magnification in the wide angle end of the third lens unit U3 is represented by β3w, a focal length of the first lens subunit is represented by f11 and a focal length of the second lens subunit is represented by f12, the values satisfy the following expressions:

$$-2.2 < f1/f2 < -0.8 \quad (1),$$

$$-0.7 < 1/\beta 3w < 0.5 \quad (2),$$

$$-0.55 < f2/f3 < -0.25 \quad (3), \text{ and}$$

$$-6.0 < f12/f11 < -2.5 \quad (4).$$

Next, the previously described technical meaning of each conditional expression will be described below.

Expressions (1) to (4) are specified so that the zoom lens attains the widening of the angle, the acquisition of high magnification and the reduction in the size and weight at the same time, and besides, attains an adequate optical performance. The expressions specify a ratio between focal lengths of the first lens unit U1 and the second lens unit U2, a ratio between focal lengths of the second lens unit U2 and the third lens unit U3, an imaging magnification of the third lens unit, and a ratio between focal lengths of a first lens subunit 11 and a second lens subunit U12. Incidentally, the zoom lens of the present invention is characterized by that the zoom lens satisfies the above described expressions (1) to (4), but as for Expressions (5) to (16) which will be described later, the zoom lens may not necessarily satisfy the expressions.

Expression (1) specifies the ratio between the focal lengths of the first lens unit U1 and the second lens unit U2 which constitute the zoom lens of the present invention. When the values satisfy Expression (1), the zoom lens can set appropriately the focal length of the first lens unit U1 with respect to that of the second lens unit U2, and accordingly can efficiently achieve the widening of the angle, the acquisition of high magnification and the reduction in the size and weight at the same time, and besides, achieve an adequate optical performance. If the values do not satisfy the condition of the upper limit of Expression (1), the zoom lens lacks in a capability of aberration correction in a telephoto side of the first lens unit U1, and a refractive power necessary for zooming of the second lens unit U2, and accordingly it becomes difficult to acquire a high zoom ratio, reduce the size and weight and attain an adequate optical performance at the same time. If the values do not satisfy the condition of the lower limit of Expression (1), the zoom lens lacks in the refractive power of the first lens unit U1, and accordingly it becomes difficult to widen the angle and reduce the size and weight.

It is desirable that the Expression (1) can be set further in the following way:

$$-2.0 < f1/f2 < -1.0 \quad (1a).$$

It is desirable that the Expression (1a) can be set further in the following way:

$$-1.8 < f1/f2 < -1.2 \quad (1aa).$$

Expression (2) is an expression which specifies an inverse number of a magnification of the third lens unit U3 at a wide angle end in the zoom lens of the present invention. Expression (2) is an expression for attempting the reduction in the size and weight of the whole lens system. When the value satisfies Expression (2), a light beam emitted from the third lens unit U3 becomes almost afocal, and accordingly the fourth lens unit U4 can be formed of few numbers of lenses, which is effective in reducing the size and weight. If the value has not satisfied the condition of the upper limit of Expression (2), the light beam emitted from the third lens unit U3 diverges strongly, and a lens unit having a strong positive refractive power for imaging the light beam results in being required in the object side of the fourth lens unit U4. Accordingly, it becomes difficult to reduce the size and weight. If the value has not satisfied the condition of the lower limit of Expression (2), the light beam emitted from the third lens unit U3 converges strongly, and a lens unit having a strong negative refractive power for securing an appropriate exit pupil and F-number results in being required in the object side of the fourth lens unit. Accordingly, it becomes difficult to reduce the size and weight.

It is desirable that the Expression (2) can be set further in the following way:

$$-0.5 < 1/\beta 3w < 0.2 \quad (2a).$$

It is desirable that the Expression (2a) can be set further in the following way:

$$-0.4 < 1/\beta 3w < 0.1 \quad (2aa).$$

Expression (3) specifies a ratio between focal lengths of the second lens unit U2 and the third lens unit U3 which constitute the zoom lens of the present invention. When the values satisfy Expression (3), the zoom lens can set appropriately the focal length of the second lens unit U2 with respect to that of the third lens unit U3, and accordingly can efficiently achieve the widening of the angle, the acquisition of high magnification and the reduction in the size and weight at the same time, and besides, achieve an adequate optical performance. If the values do not satisfy the condition of the upper limit of Expression (3), the variation of the aberration of the second lens unit U2 due to varying magnification increases, and it becomes difficult to obtain an adequate optical performance in the whole zoom region. Alternatively, the third lens unit U3 lacks in a refractive power (power), accordingly a moving amount of the third lens unit for the correction of an image plane variation due to varying magnification increases, and as a result, it becomes difficult to reduce the size and weight of the zoom lens. If the values do not satisfy the condition of the lower limit of Expression (3), the second lens unit U2 lacks in a refractive power necessary for changing its focal length, the moving amount during the varying magnification of the second lens unit U2 increases, and accordingly it becomes difficult to acquire high magnification and reduce the size and weight at the same time.

It is desirable that the Expression (3) can be set further in the following way:

$$-0.50 < f2/f3 < -0.30 \quad (3a).$$

It is desirable that the Expression (3a) can be set further in the following way:

$$-0.47 < f2/f3 < -0.35 \quad (3aa).$$

Expression (4) specifies a ratio between focal lengths of the first lens subunit U11 and the second lens subunit U12 which constitute the first lens unit U1 of the zoom lens of the present invention. When the values satisfy Expression (4), the first lens unit U1 can appropriately increase its retro-ratio, and accordingly the zoom lens can efficiently achieve the widening of the angle and reduction in the size and weight. Here, the retro-ratio to be used in the present invention is a quantity which is defined by the following Expression (A), when a back focus and a focal length when the light beam from infinite distance is incident on a target lens unit are represented by BF and F0, respectively.

$$Rf = BF/F0 \quad (A)$$

In the present invention, to increase the retro-ratio means to arrange a principal point of the target lens unit in the image side and shorten the focal length of the lens unit. As for the values of Expression (A), the above described increase is equivalent to the decrease of F0 and the increase of the value of Rf.

If the values have exceeded the upper limit of Expression (4), it becomes difficult to increase the retro-ratio sufficiently as the first lens unit, and as a result, it becomes difficult to widen the angle and reduce the size and the weight at the same time. If the values have exceeded the lower limit of Expression (4), the focus unit incurs an increase in an amount of being driven, and the second lens subunit and the third lens subunit incur an increase in the diameters. Accordingly, it becomes difficult to reduce the size and weight.

It is desirable that the Expression (4) can be set further in the following way:

$$-5.5 < f12/f11 < -3.0 \quad (4a).$$

It is desirable that the Expression (4a) can be set further in the following way:

$$-5.0 < f12/f11 < -3.3 \quad (4aa).$$

It is desirable for the zoom lens in the present invention to satisfy further one or more conditions among the following conditions.

When the focal length of the first lens subunit is represented by f11, it is desirable that the values satisfy the following expression:

$$-1.5 < f11/f1 < -0.8 \quad (5).$$

Expression (5) specifies a ratio between focal lengths of the first lens subunit U11 included in the first lens unit U1 and the first lens unit U1, in the zoom lens of the present invention. When the values satisfy Expression (5), the zoom lens can appropriately increase the retro-ratio as the first lens unit, and accordingly can further efficiently achieve the widening of the angle and reduction in the size and weight at the same time, and besides, achieve an adequate optical performance. If the values do not satisfy the condition of the upper limit of Expression (5), the negative refractive power of the first lens unit U1 becomes excessively strong, which results in requiring an excessive refractive power to the second lens subunit U12 and the third lens subunit U13 that have positive refractive power, and as a result, it becomes difficult to reduce the size and weight of the zoom lens and attain the adequate optical performance thereof at the same time. If the values do not satisfy the condition of the lower limit of Expression (5), the first lens unit U1 lacks in its negative refractive power, and accordingly it becomes difficult to widen the angle.

It is desirable that the Expression (5) can be set further in the following way:

$$-1.4 < f11/f1 < -1.0 \quad (5a).$$

Furthermore, when the focal length of the third lens subunit is represented by f13, it is desirable that the values satisfy the following expression:

$$1.4 < f13/f1 < 2.6 \quad (6).$$

Expression (6) specifies a range of an appropriate refractive power of the third lens subunit U13 with respect to the first lens unit U1, in the zoom lens of the present invention. When the values satisfy Expression (6), the zoom lens can further efficiently achieve the widening of the angle and reduction in the size and weight at the same time, and besides, achieve an adequate optical performance. If the values do not satisfy the condition of the upper limit of Expression (6), a sufficient retro-ratio cannot be obtained as the whole first lens unit, and it becomes difficult to widen the angle. Alternatively, the second lens subunit U12 results in sharing an excessive positive refractive power, and accordingly it becomes difficult to suppress the variation of aberration when an object distance varies and reduce the size and weight. If the values do not satisfy the condition of the lower limit of Expression (6), the zoom lens incurs an increase in a higher order aberration and a distortion due to a decrease in a radius of curvature of each lens in the third lens subunit U13, and an increase in the number of constituting lenses and the weight of the lens, and it becomes difficult to reduce the size and weight, and attain an adequate optical performance at the same time.

It is desirable that the Expression (6) can be set further in the following way:

$$1.5 < f13/f1 < 2.3 \quad (6a).$$

Furthermore, the values can further satisfy the following expression:

$$1.5 < f13/f1 < 2.1 \quad (6aa).$$

Furthermore, it is desirable that the first lens subunit has at least one or more lenses having positive refractive power and at least one or more lenses having negative refractive power, respectively, and when a combined focal length of the lens unit having negative refractive power in the first lens subunit is represented by f11n, the values satisfy the following expressions:

$$0.50 < f11n/f11 < 0.85 \quad (7).$$

If the values do not satisfy the condition of the upper limit of Expression (7), the first lens subunit U11 lacks in its negative refractive power, and accordingly it becomes difficult to obtain a sufficient effect of the widening of the angle. If the values do not satisfy the condition of the lower limit of Expression (7), the zoom lens incurs an increase in a higher order aberration due to a decrease in a radius of curvature of the lens having negative refractive power, and an increase in the number of constituting lenses and the weight of the lens, and it becomes difficult to reduce the size and weight, and attain an adequate optical performance at the same time.

Furthermore, the values further desirably satisfy the expression:

$$0.55 < f11n/f11 < 0.80 \quad (7a).$$

Next, it is desirable that when a combined focal length of a lens unit having the positive refractive power in the same first lens subunit is represented by f11p, the values satisfy the following expression:

$$-6.0 < f11p/f11 < -1.5 \quad (8).$$

If the values do not satisfy the condition of the upper limit of Expression (8), the radius of curvature of each lens in the first lens subunit U11 is decreased so as to obtain a sufficient effect of the widening of the angle, and it becomes difficult to correct the higher order aberration and reduce the size and weight. If the values do not satisfy the condition of the lower limit of Expression (8), it becomes difficult to correct aberration in the f11 first lens subunit U11 incident to the variation of the object distance.

Furthermore, the values further desirably satisfy the following expression:

$$-5.5 < f11p/f11 < -2.0 \quad (8a).$$

The above described expressions (7) and (8) specify ranges of appropriate refractive powers of negative refractive power component and positive refractive power component in the first lens subunit U11 which constitutes the zoom lens of the present invention. It is desirable for the first lens subunit U11 to have at least one or more lenses having positive refractive power and at least one or more lenses having negative refractive power, respectively. If the first lens subunit U11 includes only lenses having negative refractive power, it becomes difficult to correct chromatic aberration in the first lens subunit and correct the variation of aberration when the object distance has varied. Furthermore, when the values satisfy Expression (7) and Expression (8), the zoom lens can further efficiently achieve the widening of the angle and reduction in the size and weight at the same time, and besides, achieve an adequate optical performance.

Furthermore, it is desirable that when the focal length of the second lens subunit is represented by f12 and an average Abbe constant of an optical material to be used in the second lens subunit is represented by ν12, the values satisfy the following expressions:

$$3.0 < f12/f1 < 7.0 \quad (9), \text{ and}$$

$$60 < \nu12 \quad (10).$$

Expression (9) and Expression (10) specify a ratio between focal lengths of a second lens subunit U12 and a first lens unit U1 which constitute the zoom lens of the present invention, and a dispersion of an optical material to be used in the zoom lens.

Here, the Abbe constant and the partial dispersion ratio of the optical material used in each claim and each embodiment of the present invention are as follows. The refractive indices of the optical material with respect to a g-line (435.8 nm), an F-line (486.1 nm), a d-line (587.6 nm), and a C-line (656.3 nm) of Fraunhofer lines shall be represented by Ng, NF, Nd and NC, respectively. The Abbe constant νd and the partial dispersion ratio θgF concerning the g-line and the F-line are given as in the following Expression (B) and Expression (C):

$$\nu d = (Nd-1)/(NF-NC) \quad (B), \text{ and}$$

$$\theta gF = (Ng-NF)/(NF-NC) \quad (C).$$

Here, the axial paraxial ray and the pupil paraxial ray are rays of light defined as follows. The axial paraxial ray is a paraxial ray which is incident on the optical system in parallel to the optical axis with an incidence height set at 1, on the assumption that a focal length of the whole optical system at a wide angle end is normalized to be 1. The pupil paraxial ray is a paraxial ray which passes through an intersection of an incident pupil of the optical system and the optical axis among the rays incident on the maximum image height of the image pickup plane, on the assumption that the focal length of the whole optical system at the wide angle end is normalized to be 1.

Figure 13:
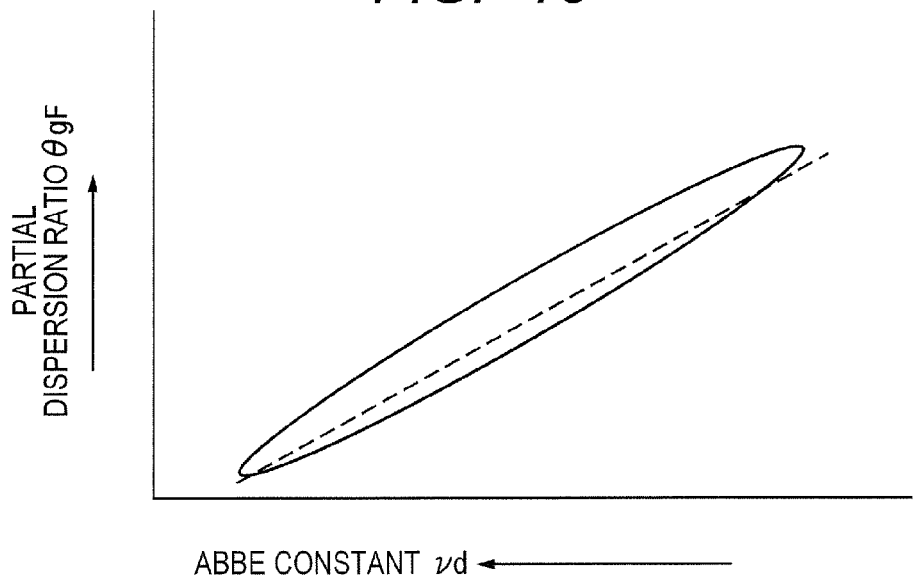
FIG. 13 illustrates a schematic view of the distribution of an Abbe constant of an existing glass with respect to a partial dispersion ratio.

As is illustrated in FIG. 13, an existing optical material has the partial dispersion ratio θgF which is distributed in a narrow range with respect to the Abbe constant νd, and θgF has the tendency to increase as νd decreases.

In a thin and closely contacting lens system having a predetermined refractive power Φ that is constituted by two lenses Gp and Gn which have positive refractive power Φp and negative refractive power Φn, Abbe constants νp and νn, an incidence height h of an axial paraxial ray, and an incidence height H of a pupil paraxial ray, a coefficient L of axial chromatic aberration and a coefficient T of lateral chromatic aberration are expressed by the following Expression (D) and Expression (E).

$$L = h \times h \times (\Phi p/\nu p + \Phi n/\nu n) \quad (D)$$

$$T = h \times H \times (\Phi p/\nu p + \Phi n/\nu n) \quad (E)$$

Here, $$\Phi = \Phi p + \Phi n \quad (F)$$

The refractive power of each lens in Expression (D) and Expression (E) is normalized so that Φ in the Expression (F) becomes 1. The case where the lens system is constituted by three or more lenses can also be considered in a similar way. In Expression (D) and Expression (E), suppose that L=0 and T=0. Then, imaging positions of the C-line and F-line on the axis and on the image plane coincide with each other. Thus, an operation of correcting chromatic aberration with respect to certain particular two wavelengths is generally referred to as two-wavelength achromatism (primary spectrum correction). In a zoom lens particularly having high magnification, chromatic aberration of each lens unit, in other words, L and T are corrected so as to be set in the vicinity of approximately zero, in order to suppress the variation of chromatic aberration due to varying magnification.

When the light beam is incident on the lens system from the infinite object distance, and when a deviation quantity of the axial chromatic aberration and a deviation quantity of the lateral chromatic aberration of the g-line with respect to the F-line are defined as a quantity Δs of a secondary spectrum of the axial chromatic aberration and a quantity Δy of a secondary spectrum of the lateral chromatic aberration, respectively, Δs and Δy are expressed by the following expressions:

$$\Delta s = -h \times h \times (\theta p - \theta n)/(\nu p - \nu n) \times f \quad \text{(G), and}$$

$$\Delta y = -h \times H \times (\theta p - \theta n)/(\nu p - \nu n) \times Y \quad \text{(H).}$$

Here, f shall, represent a focal length of the whole lens system, and Y shall represent an image height. Thus, an operation of further adding a particular wavelength to the wavelengths and correcting the chromatic aberration with respect to certain particular three wavelengths is generally referred to as three-wavelength achromatism (secondary spectrum correction).

The two-wavelength achromatism (primary spectrum correction) and the three-wavelength achromatism (secondary spectrum correction) in each of the following claims and embodiments will be described below with reference to relational expressions from the above described Expression (B) to Expression (H).

The second lens subunit U12 in each of the embodiments of the present invention moves as a focal unit in the optical axis direction. It is effective to decrease the dispersion of the movable focus lens unit (to increase Abbe constant), particularly in order to suppress the variation of the chromatic aberration due to the variation of the object distance at a telephoto end. The above effectiveness can also be described from the fact that coefficients L and T of axial chromatic aberration and lateral chromatic aberration are inversely proportional to the Abbe constant in the above described Expression (D) and Expression (E).

Thus, when the values satisfy Expression (9) and Expression (10), a relationship between a focal length and chromatic aberration correction of the second lens subunit U12 which is the focus unit can be set, and accordingly the zoom lens can further efficiently achieve the widening of the angle and reduction in the size and weight at the same time, and besides, achieve an adequate optical performance. If the values do not satisfy the condition of the upper limit of Expression (9), the focus unit lacks in its refractive power and a movement distance of the focus increases, which is accordingly disadvantageous to reduction in the size and weight. If the values do not satisfy the condition of the lower limit of Expression (9), the radius of curvature of the lens decreases and the thickness of the lens increases, which is consequently disadvantageous to the reduction in the size and weight. Furthermore, a focusing position is largely changed by a slight movement distance. Accordingly it becomes difficult to manufacture the focus drive portion and it becomes difficult to control focusing. If the values do not satisfy the condition of the lower limit of Expression (10), it becomes difficult to correct particularly the variation of the chromatic aberration due to the variation of the object distance, as has been described above with reference to Expression (D) and Expression (E).

It is desirable that Expression (9) and Expression (10) can be set further in the following way:

$$3.3 < f12/f1 < 6.5 \quad \text{(9a), and}$$

$$62 < \nu12 < 90 \quad \text{(10a)}$$

It is desirable that Expression (9a) and Expression (10a) can be set further in the following way:

$$4.0 < f12/f1 < 6.3 \quad \text{(9aa), and}$$

$$64 < \nu12 < 80 \quad \text{(10aa).}$$

Furthermore, when ft represents a focal length of the whole system of the zoom lens at a telephoto end, νfn represents an average value of an Abbe constant of a glass material to be used for the lens having the negative refractive power, which is included in the first lens subunit, and νfp represents an average value of an Abbe constant of a glass material to be used for the lens having the positive refractive power, which is included in the first lens subunit, it is desirable that the values satisfy the following expressions:

$$1.0 < ft/f1 < 2.2 \quad \text{(11), and}$$

$$20.0 < \nu fn - \nu fp < 45.0 \quad \text{(12).}$$

Expression (11) and Expression (12) specify a ratio between a focal, length of the zoom lens of the present invention at a telephoto end and a focal length of the first lens unit U1, and a range of the correction of chromatic aberration in the first lens subunit U11.

When further widening of the angle of the zoom lens is attempted, an incidence height H of the pupil paraxial ray in the above described expression (H) increase, and accordingly the secondary spectrum of the lateral chromatic aberration also increases. On the other hand, the secondary spectrum of the axial chromatic aberration expressed by Expression (G) does not comparatively become a problem in a wide angle zoom lens having a small magnification as specified in Expression (11), because the secondary spectrum is proportional to the focal length f. Accordingly, it is effective to select such achromatism as to be advantageous to the correction of the secondary spectrum of the lateral chromatic aberration, in order to attain further widening of the angle of the zoom lens. Furthermore, the lateral chromatic aberration can be effectively corrected by arranging an appropriate optical material and an appropriate refractive power in the first lens subunit, because the pupil paraxial ray H increases particularly in the first lens subunit of the first lens unit at a zoom position in a wide angle side.

It is effective to strengthen the negative refractive power of the first lens subunit, in order to increase the retro-ratio for further widening the angle, but only a material having a small Abbe constant νd exists in existing optical materials having a high refractive index. If the material having a small Abbe constant νd has been adopted, a denominator of Expression (H) decreases, and the secondary spectrum of the lateral chromatic aberration results in increasing. Then, when the optical material which has a large Abbe constant νd and a large partial dispersion ratio θgF is selected for a lens having negative refractive power, which constitutes the first lens subunit, the denominator of Expression (H) increases and the numerator thereof decreases, and accordingly the secondary spectrum of the lateral chromatic aberration can be decreased.

When the values of the zoom lens satisfy Expression (11) and Expression (12), the zoom lens can widen the angle, and can further adequately correct lateral chromatic aberration and distortion which increase as the angle is widened. If the values do not satisfy the condition of the upper limit of Expression (11), the zoom lens results in being supposed to have a large magnification with respect to the first lens unit U1. Then, the zoom lens results in lacking in the axial chromatic aberration, by the correction of the chromatic aberration specified in Expression (12). If the values do not satisfy the condition of the lower limit of Expression (11), the lens system results in being supposed to have a long focal length of the first lens unit. Then, it becomes difficult to widen the angle. If the values do not satisfy the condition of the upper limit of Expression (12), achromatism becomes excessive and each lens in the first lens subunit lacks in a refractive power. Then, it becomes difficult to impart a sufficient retro-ratio and capability of aberration correction to the zoom lens. If the values do not satisfy the condition of the lower limit of Expression (12), the radius of curvature of the respective lenses decreases, and it becomes difficult to reduce the size and weight and attain an adequate optical performance at the same time.

It is desirable that the expression (11) and the expression (12) can be set further in the following way:

$$1.2 < ft/f1 < 2.0 \quad (1a), \text{ and}$$

$$25.0 < \nu fn - \nu fp < 40.0 \quad (12a).$$

It is desirable that the expression (12a) can be set further in the following way:

$$1.3 < ft/f1 < 1.8 \quad (11aa), \text{ and}$$

$$27.0 < \nu fn - \nu fp < 38.0 \quad (12aa).$$

Furthermore, when $\nu\nu n$ represents the maximum value of an Abbe constant of a glass material to be used for a lens having negative refractive power, which is included in the second lens unit U2 of the zoom lens, $\theta\nu n$ represents a partial dispersion ratio of the optical material thereof, $\nu\nu p$ represents the minimum value of an Abbe constant of a glass material to be used for a lens having positive refractive power, which is included in the second unit, and $\theta\nu p$ represents a partial dispersion ratio of the optical material thereof, it is desirable that the values satisfy the following expressions:

$$35.0 < \nu\nu n - \nu\nu p < 75.0 \quad (13), \text{ and}$$

$$-2.2 \times 10^{-3} < (\theta\nu p - \theta\nu n)/(\nu\nu p - \nu\nu n) < -1.0 \times 10^{-3} \quad (14).$$

Expression (13) and Expression (14) specify two-wavelength achromatism and three-wavelength achromatism in the second lens unit U2 of the zoom lens of the present invention.

In each of the embodiments of the present invention, it is effective to adequately correct the two-wavelength achromatism and the three-wavelength achromatism in the second lens unit U2, in order to suppress the secondary spectrum and the variation due to the zooming of the lateral chromatic aberration at the wide angle end. Because the second lens unit U2 has negative refractive power as the whole unit, the second lens unit U2 can adequately attain the two-wavelength achromatism for L and T, by setting $\nu\nu n$ with respect to negative refractive power component at a large value and $\nu n p$ with respect to positive refractive power component at a small value. The second lens unit U2 also plays a role of correcting remaining chromatic aberration as well which has not been corrected completely in the first lens unit U1. When the first lens unit has positive refractive power, if the angle of field of the zoom lens has been attempted to be further widened, an amount of the lateral chromatic aberration of the g-line, which has remained in an over side, increases after the two-wavelength achromatism. Then, a lens having negative refractive power of the second lens unit U2 having a high pupil paraxial ray H adopts an optical material having a large partial dispersion ratio $\theta gF$. Thereby, the g-line of the lateral chromatic aberration can be corrected to an under side. In other words, the adoption decreases the numerator in Expression (H) and Expression (14), and thereby shows an effect of suppressing an increase of the secondary spectrum $\Delta y$ of the lateral chromatic aberration.

When the values satisfy Expression (13) and Expression (14), the zoom lens can further adequately correct the lateral chromatic aberration which increases mainly as the angle of field is widened. If the values do not satisfy the condition of the upper limit of Expression (13), a lens which mainly plays a role of correcting the chromatic aberration cannot have a sufficient refractive power, and the zoom lens lacks in a capability of correcting the lateral chromatic aberration. As a result, it becomes difficult to widen the angle of field and attain an adequate optical performance at the same time. If the values do not satisfy the condition of the lower limit of Expression (13), a difference (difference of Abbe constant) between the maximum value $\nu\nu n$ of the Abbe constant of a glass material for a negative lens, which is included in the second lens unit U2, and the minimum value $\nu\nu p$ of the Abbe constant of a glass material for a positive lens, which is included in the second lens unit U2, decreases, and the radius of curvature decreases. As a result, it becomes difficult to reduce the size and weight and attain an adequate optical performance at the same time. If the values do not satisfy the condition of the upper limit of Expression (14), optical materials of which the difference between Abbe constants is small cannot help being selected as a combination of glass materials to be generally used, and it becomes difficult to reduce the size and weight and attain an adequate optical performance at the same time. If the values do not satisfy the condition of the lower limit of Expression (14), the zoom lens lacks in the correction of the secondary spectrum as in the above description for the Expression (H), and it becomes difficult to adequately correct the lateral chromatic aberration which increases as the angle of field is widened.

It is desirable that the expression (13) and the expression (14) can be set further in the following way:

$$40.0 < \nu\nu n - \nu\nu p < 70.0 \quad (13a), \text{ and}$$

$$-2.0 \times 10^{-3} < (\theta\nu p - \theta\nu n)/(\nu\nu p - \nu\nu n) < -1.2 \times 10^{-3} \quad (14a).$$

Furthermore, the third lens unit of the zoom lens desirably satisfies such a condition that the third lens unit includes, from the object side, a lens having negative refractive power, a lens having positive refractive power, and a lens having positive refractive power.

The above described condition specifies the configuration of the lenses of the third lens unit U3 of the zoom lens of the present invention. When the values satisfy the above described condition, the zoom lens can further adequately correct the field curvature which increases particularly as the angle is widened.

Figure 11A:
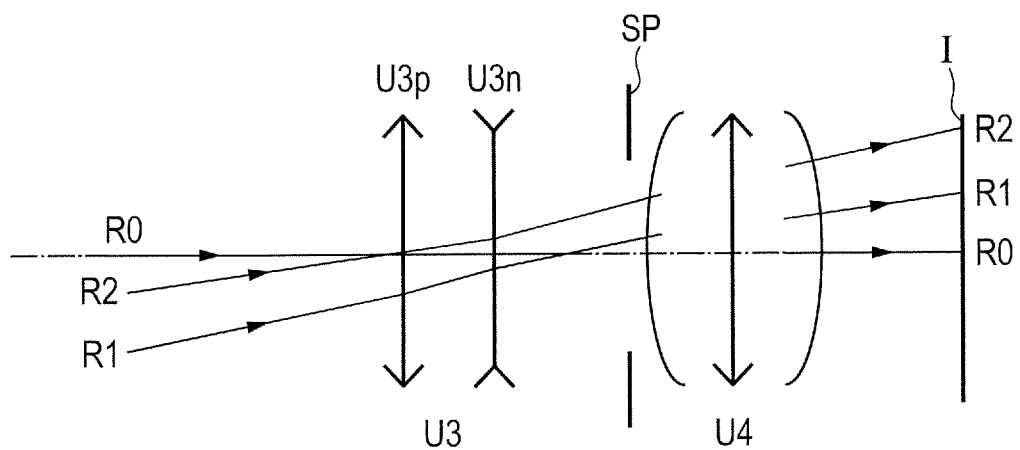
FIG. 11A illustrates a schematic view of the configuration of a third lens unit in a zoom lens of the present invention.
Figure 11B:
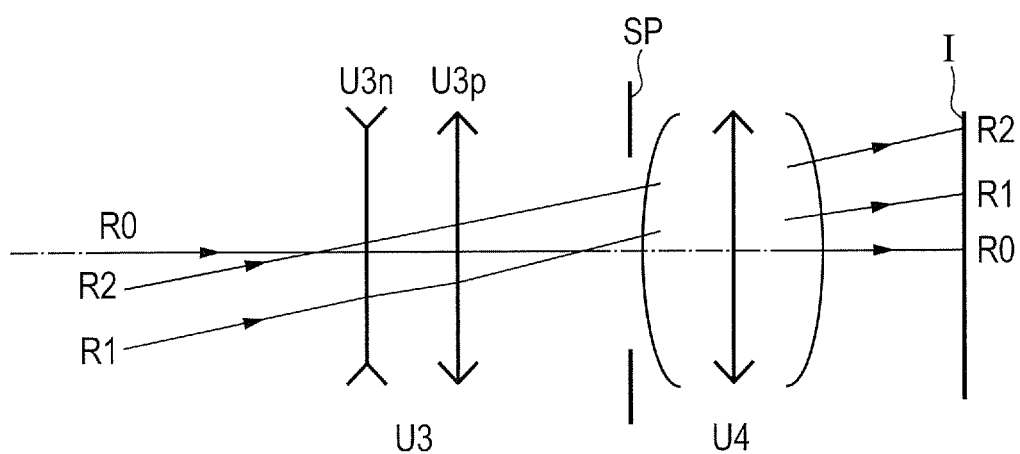
FIG. 11B illustrates a schematic view of the configuration of the third lens unit in the zoom lens of the present invention.

The above described condition will be described below with reference to FIGS. 11A and 11B. FIGS. 11A and 11B conceptually illustrate a view of an optical path at a zoom position mainly in the vicinity of the wide angle end at which the waviness of field curvature is large, in the zoom lens of the present invention. Factors particularly concerning the third lens unit U3 will be extracted and described below. A principal ray of an axial beam which passes through the third lens unit U3 is represented by R0, a principal ray of an off-axial beam which images on the middle image height of the image plane I is represented by R1, and a principal ray of an off-axial beam which images on an image height in a further peripheral side than R1 is represented by R2. The third lens unit U3 illustrated in FIG. 11A shows that the third lens unit U3 includes, sequentially from an object side, a lens unit U3p having positive refractive power and a lens unit U3n having negative refractive power. The third lens unit U3 illustrated in FIG. 11B shows that the third lens unit U3 includes, sequentially from an object side, a lens unit U3n having negative refractive power and a lens unit U3p having positive refractive power. Here, the lens unit U3p having the positive refractive power may be considered to include one lens, and may also be considered to include two or more serial lenses. Furthermore, it may be supposed that the third lens unit U3 includes the lens unit U3p having the positive refractive power and the lens unit U3n having the negative refractive power which are cemented to each other. The configuration of the third lens unit U3 as in FIG. 11A is generally considered to be advantageous to the simultaneous attainment of the widening of the angle of field and the reduction in the size and weight of a zooming portion, because the configuration has an effect of arranging a principal point to the object side. However, in the zoom lens according to the present invention, there is the case where the height of the off-axial beam R1 is most distant from the optical axis among the off-axial beams which reach the third lens unit U3 as are illustrated in FIGS. 11A and 11B. In this case, if the third lens unit receives the light beam to be incident thereon by the lens unit U3p having positive refractive power, as is illustrated in FIG. 11A, the light beam causes one reason of the waviness of an under side on the field curvature of the middle image height. Then, the lens unit U3n having negative refractive power is arranged in the most object side of the third lens unit U3, as is illustrated in FIG. 11B, thereby an effect of correcting the off-axial light beam R1 to an over side is obtained, and accordingly an effect of lessening the waviness of the field curvature can be given. In the zoom type of the present invention, in order to attain further widening of the angle of field, the acquisition of high magnification and the reduction in the size and weight, it is effective to adopt such a movement locus that the third lens unit starts moving from the object side. The more the third lens unit is arranged in the object side, the more a height from the optical axis of the off-axial beam R1 increases, and accordingly the above described technology becomes more effective. As is illustrated in FIG. 11A, when a lens U3n having negative refractive power is arranged close to the stop and the height from the optical axis of the off-axial beam R1 becomes low, an effect of correcting the waviness of the field curvature becomes weak.

Furthermore, the first lens subunit or the second lens subunit of the zoom lens has a lens having an aspherical surface at least on one or more surfaces of the lens.

The above described condition specifies that a lens having the aspherical surface shape is arranged in the first lens subunit U11 or the second lens subunit U12 of the zoom lens of the present invention. The aspherical surface shape in each embodiment of the present invention is desirably arranged so as to have such a shape that the central part of the lens has the refractive power of divergence or convergence but the refractive power is lessened in the peripheral part of the lens. When the aspherical surface is arranged on the lens surface having negative refractive power of the first lens subunit, for instance, if the aspherical surface has been arranged so as to have such a shape as to lessen the divergence with respect to such a situation that the light beam is incident at a sharp angle with respect to the optical axis as the angle is widened, the arrangement can suppress a barrel-shaped distortion which increases in the wide angle side in particular. On the contrary, when the aspherical surface is arranged on a lens surface having positive refractive power of the first lens subunit or the second lens subunit, if the aspherical surface has been arranged so as to have such a shape as to lessen the refractive power which converges the light beam toward the optical axis, the arrangement can suppress a pincushion distortion which increases mainly after a position at which the zoom lens is slightly shifted toward a telephoto side from the wide angle end. The arrangement can also give a sufficient negative and positive refractive power to the central part of the lens, accordingly facilitates the retro-ratio to be increased, and is effective in attaining the widening of the angle of field and an adequate correction of aberration at the same time.

Furthermore, when the widening of the angle of field of the zoom lens is attempted, the waviness of the field curvature tends to increase. In each embodiment of the present invention as well, there has been such a tendency that the waviness increases to an under side in a middle image height, mainly at the zoom position in the wide angle side, as the angle of field is widened. Then, the aspherical surface is arranged on an appropriate lens surface of the first lens subunit or the second lens subunit, thereby the light beam of the middle image height can be corrected to an over side, and the waviness of the field curvature can be lessened.

When the values satisfy the above described condition, the distortion and the field curvature which increase particularly as the angle is widened can be further effectively corrected.

Furthermore, in an image pickup apparatus having the zoom lens according to the present invention, when a focal length of the whole system at the wide angle end is represented by fw, the values desirably satisfy the following conditional expression:

$$1.5 < ft/fw < 5.0 \qquad (15).$$

If the values do not satisfy the condition of the upper limit of Expression (15), the refractive power of each unit becomes strong in order to suppress a moving amount necessary for varying magnification, and it becomes difficult to reduce the size and weight and attain the adequate optical performance thereof at the same time. If the values do not satisfy the condition of the lower limit of Expression (15), the lens system should be a lens system with small magnification, and an excessive space and an excessive correction of aberration occur in the technology of the present invention. Then, it becomes difficult to reduce the size and weight and attain the adequate optical performance thereof at the same time.

In addition, when a photographing angle of field at a wide angle end of the zoom lens is represented by ωw, the values desirably satisfy the following conditional expression:

$$37.0 < \omega w < 50.0 \qquad (16).$$

If the values do not satisfy the condition of the upper limit of Expression (16), the zoom lens lacks in the arrangement of a principal point of each unit to the image side and a capability of aberration correction when the angle of field is further widened, and it becomes difficult to widen the angle of field and attain the adequate optical performance thereof at the same time. If the values do not satisfy the condition of the lower limit of Expression (16), a comparatively telephoto-based lens results in being supposed, the number of constituting lenses excessively increases, and the zoom lens lacks in the capability of aberration correction such as the axial chromatic aberration in particular. Then, it becomes difficult to reduce the size and weight and attain the adequate optical performance thereof at the same time.

Expression (15) and Expression (16) specify a range of a zoom magnification of the zoom lens of the present invention, and a half angle of field at a wide angle end thereof. When the values satisfy Expression (15) and Expression (16), a technology such as the zoom type, the arrangement of the refractive powers and the correction of the aberration which have been adopted in each embodiment of the present invention can be most effectively developed.

It is desirable that the Expression (15) and Expression (16) can be set in the following way:

$$2.0 < ft/fw < 4.5 \qquad (15a), \text{ and}$$

$$40.0 < \omega w < 48.5 \qquad (16a).$$

Embodiment 1

The specific lens configuration according to a first embodiment of the present invention will be described below with reference to FIG. 1.

The zoom lens shown in the first embodiment includes, in order from the object side: a first lens unit having positive refractive power, which does not move for varying magnification; a second lens unit having negative refractive power, which moves during varying magnification; a third lens unit having positive refractive power, which plays a role of correcting an image plane variation during varying magnification; and a fourth lens unit having positive refractive power, which does not move for varying magnification.

The first lens unit includes, in order from the object side, a first lens subunit having negative refractive power, which does not move for focusing, a second lens subunit having positive refractive power, which moves in the optical axis direction during focusing, and a third lens subunit having positive refractive power, which does not move for focusing. The first lens subunit includes, in order from the object side, three lenses having negative refractive power and one lens having positive refractive power. The lenses having negative refractive power are serially arranged in the object side of the first lens subunit, thereby each lens facilitates the retro-ratio to be increased while suppressing an increase in the radius of curvature, and thereby the arrangement is advantageous to the simultaneous attainment of the widening of the angle of field and an adequate optical performance. In addition, a lens having negative refractive power of the first lens subunit is formed of an optical material having small dispersion, and thereby the zoom lens can adequately correct the lateral chromatic aberration which increases particularly as the angle of field is widened. Furthermore, lenses having negative and positive refractive powers are arranged in combination in the first lens subunit, and thereby the zoom lens can adequately correct the variation of aberration and particularly the variation of the lateral chromatic aberration due to the change of the object distance. In Embodiment 1, an aspherical surface is arranged on a negative lens in a side closest to the object of the first lens subunit, and thereby the zoom lens adequately corrects the distortion and field curvature which increase as the angle of field is widened. The second lens subunit is constituted by one lens having positive refractive power. The second lens subunit includes one lens having small dispersion, and thereby the zoom lens attains the reduction in the size and weight of a movable focus lens unit and the suppression of the variation of aberration due to the change of the object distance, at the same time. The third lens subunit includes a cemented lens constituted by a negative lens and a positive lens, and two lenses having positive refractive power. The third lens subunit includes a negative lens arranged in its object side and thereby enhances an action of positioning the principal point of the third lens subunit to the image side, and the zoom lens attains the widening of the angle of field and reduction in the size and weight at the same time.

The second lens unit includes a lens having negative refractive power, a cemented lens constituted by a negative lens and a positive lens, and a lens having negative refractive power, and moves along a locus as to monotonically move to the image side from the object side when varying magnification to the telephoto end from the wide angle end. The second lens unit includes a lens having negative refractive power in the object side and thereby enhances an action of positioning an object side principal point of the second lens unit to the object side, and the zoom lens attains the widening of the angle of field and reduction in the size and weight. In addition, the second lens unit has the lens having the negative refractive power formed of an optical material having small dispersion arranged in its side close to the object, and thereby the zoom lens adequately corrects the lateral chromatic aberration particularly in the wide angle side.

The third lens unit includes a lens having positive refractive power, a lens having positive refractive power and a lens having negative refractive power, and moves along such a locus as to move toward the image side after moving to the object side when varying magnification from the wide angle end to the telephoto end. The third lens unit includes a negative lens arranged in the most image side, and thereby enhances an action of positioning the principal point of the third lens unit to the object side, and the zoom lens attains the widening of the angle of field and reduction in the size and weight. The fourth lens unit includes seven lenses.

The values relating to the conditional expressions of the first embodiment are shown in Table 1. Numerical Embodiment 1 satisfies all conditional expressions, and the zoom lens realizes an adequate optical performance while attaining the widening of the angle of field, high magnification and the reduction in the size and weight.

Incidentally, the cemented lenses in the embodiment of the present invention may exist as separated lenses having a slight air gap therebetween. The variation is within a range of an assumption of a modification and change of the lens shape, in the present invention, which is similar also in all the following embodiments.

Embodiment 2

The specific lens configuration according to a second embodiment of the present invention will be described below with reference to FIG. 3. In the each of the following embodiments, a difference between each embodiment and the previously described embodiment, and a feature of each embodiment will be mainly described.

The zoom lens shown in the second embodiment includes a first lens subunit which includes, in order from the object side, two lenses having negative refractive power and one lens having positive refractive power. A space between the lenses is appropriately secured, and thereby the first lens subunit attains the further reduction in the size and weight and an adequate optical performance at the same time, without extremely enhancing the refractive power of the lenses. Furthermore, an aspherical surface is arranged on the first lens having negative refractive power in the first lens subunit, and thereby the aberrations, in particular, a field curvature and a distortion, in the wide angle side are effectively corrected. The second lens subunit is a cemented lens which is made by cementing a lens having positive refractive power and a lens having negative refractive power. A movable focus lens unit is constituted by the cemented lens, and thereby the zoom lens can adequately correct the variation of the optical performance and the variation of chromatic aberration in particular, due to the variation of the object distance. The third lens subunit includes a lens having positive refractive power, a cemented lens made by cementing a lens having negative refractive power and a lens having positive refractive power, and two lenses having positive refractive power. The number of the lenses having positive refractive power is increased, which constitute the third lens subunit, thereby the radius of curvature of each lens increases, and the thickness of the lens can be thinned. Accordingly, the zoom lens attains an adequate optical performance and the reduction in the size and weight at the same time.

The values relating to the conditional expressions of the second embodiment are shown in Table 1. Numerical Embodiment 2 satisfies the conditional expressions, and the zoom lens realizes an adequate optical performance while attaining the widening of the angle of field, the acquisition of high magnification and the reduction in the size and weight.

Embodiment 3

The specific lens configuration according to a third embodiment of the present invention will be described below with reference to FIG. 5.

In the zoom lens shown in the third embodiment, an aspherical surface is arranged on the first lens having negative refractive power in a first lens subunit, and an aspherical surface is arranged on a lens having a positive refractive power in a second lens subunit. Thereby, the zoom lens corrects the aberration in a wide angle side, and effectively corrects a field curvature, a distortion and the like in particular. A second lens unit includes, in order from an object side, two lenses having negative refractive power, and a cemented lens constituted by a negative lens and a positive lens. The second lens unit arranges a negative lens in the side close to the object, and thereby strengthens an action of positioning the object side principal point of the second lens unit to the object side, which is advantageous to the widening of the angle. A third lens unit includes a cemented lenses constituted by a negative lens and a positive lens, and a lens having a positive refractive power. The third lens unit arranges a lens having negative refractive power in the object side and thereby strengthens an action of correcting the waviness of an image plane, which increases as the angle of field is widened, and the zoom lens attains further widening of the angle and an adequate optical performance at the same time.

The values corresponding to each conditional expression of the third embodiment are shown in Table 1. Numerical Embodiment 3 satisfies any conditional expression, and the zoom lens is achieved which has an adequate optical performance while attaining the widening of the angle of field, the acquisition of high magnification and the reduction in the size and weight.

Embodiment 4

The specific lens configuration according to a fourth embodiment of the present invention will be described below with reference to FIG. 7.

In the zoom lens shown in the fourth embodiment, a first lens subunit includes, in order from an object side, two lenses having negative refractive power, and a cemented lens constituted by a negative lens and a positive lens. In the first lens subunit, lenses therein in which an off-axial beam passes through a higher position from the optical axis, from a wide angle side to a middle position of the zoom, are cemented to form the cemented lens and thereby the zoom lens attains the reduction in the size and weight and an adequate optical performance at the same time. An aspherical surface is arranged on the first lens having negative refractive power in the first lens subunit, and thereby the zoom lens corrects the aberration in a wide angle side, and effectively corrects a field curvature, a distortion and the like in particular. A second lens unit is constituted by two lenses having negative refractive power, a lens having positive refractive power, and a lens having negative refractive power. In the second lens unit, two lenses therein having negative and positive refractive powers are disposed to have a space therebetween, instead of being cemented to each other, and thereby secures the flexibility of aberration correction. A third lens unit includes cemented lenses having negative and positive refractive powers respectively, and a lens having positive refractive power. The third lens unit arranges a lens having negative refractive power in the object side and thereby strengthens an action of correcting the waviness of an image plane, which increases as the angle is widened, and the zoom lens attains further widening of the angle and an adequate optical performance at the same time.

The values corresponding to each conditional expression of the fourth embodiment are shown in Table 1. Numerical Embodiment 4 satisfies conditional expressions, and the zoom lens realizes an adequate optical performance while attaining the widening of the angle of field, the acquisition of high magnification and the reduction in the size and weight.

Embodiment 5

The specific lens configuration according to a fifth embodiment of the present invention will be described below with reference to FIG. 9.

In the zoom lens shown in the fifth embodiment, an aspherical surface is arranged on the second lens having negative refractive power in a first lens subunit, and an aspherical surface is arranged on a lens having positive refractive power in a second lens subunit. Thereby, the zoom lens corrects an aberration in a wide angle side, and effectively corrects a field curvature, a distortion and the like in particular. Furthermore, the second lens subunit which is a movable focus lens unit has a strong refractive power within an appropriate range and decreases a movement amount of the focus lens, and thereby the zoom lens attains the reduction in the size and weight of the first lens unit as well. A material having a high refractive index and small dispersion within an appropriate range is selected for an optical material which constitutes the second lens subunit, and thereby the zoom lens attains the reduction in the size and weight and an adequate optical performance at the same time.

The values corresponding to each conditional expression of the fifth embodiment are shown in Table 1. Numerical Embodiment 5 satisfies conditional expressions, and the zoom lens realizes an adequate optical performance while attaining the widening of the angle, the acquisition of high magnification and the reduction in the size and weight.

An image pickup apparatus having each embodiment of the present invention will be described below with reference to FIG. 12.

Figure 12:
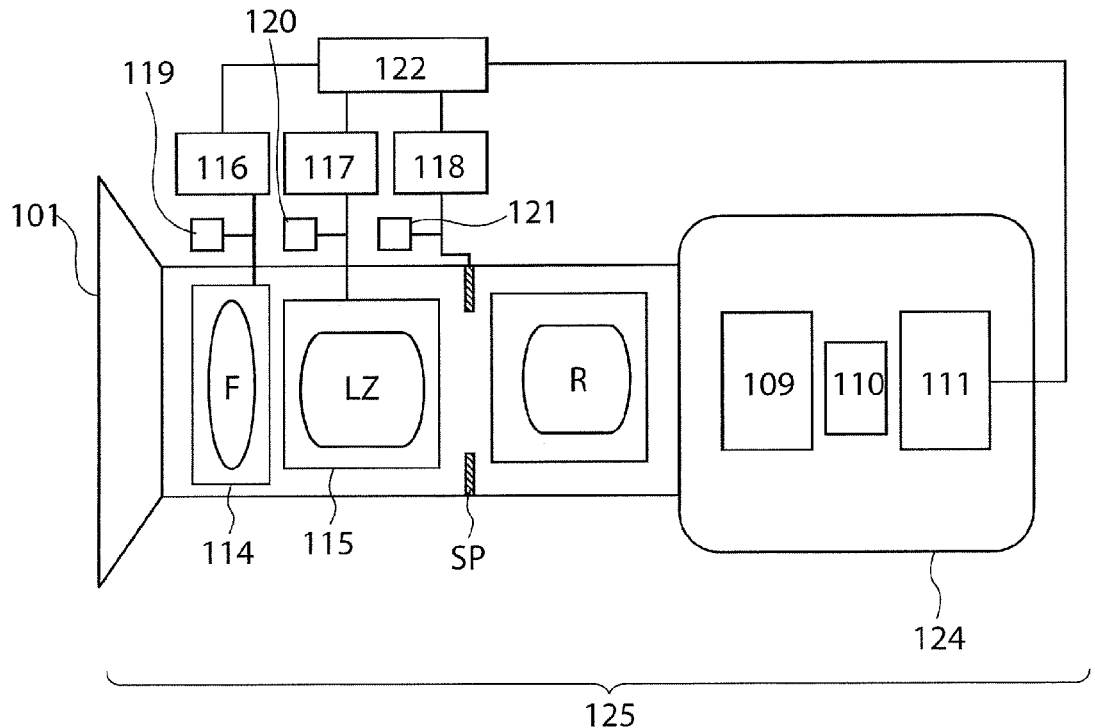
FIG. 12 illustrates a schematic view of an image pickup apparatus which uses the zoom lens of the present invention as a photographing optical system.

FIG. 12 is a schematic view of an essential part of an image pickup apparatus (television camera system) which uses a zoom lens of Embodiments 1 to 5 as a photographing optical system. In FIG. 12, a zoom lens 101 is one of zoom lenses in Embodiments 1 to 5. A camera 124 is shown. The zoom lens 101 is structured so as to be removable from the camera 124. An image pickup apparatus 125 includes the camera 124 and the zoom lens 101 which is mounted on the camera. The zoom lens 101 has a first lens unit F, a zooming portion LZ, and a fourth lens unit R for imaging. The first lens unit F includes a lens unit for focusing. The zooming portion LZ includes: a second lens unit which moves in the optical axis direction for varying magnification; and a third lens unit which moves in the optical axis direction for correcting the variation of the image plane due to varying magnification. An aperture stop SP is shown. Driving mechanisms 114 and 115 include a helicoid and a cam, and drive the first lens unit F and the zoom portion LZ in the optical axis direction, respectively. Motors (driving unit) 116 to 118 electrically drive the driving mechanisms 114 and 115 and the aperture stop SP. Detectors 119 to 121 include an encoder, a potentiometer and a photosensor, and detect positions of the first lens unit F and the zoom portion LZ on the optical axis, and the diameter of the aperture stop SP. In the camera 124, a glass block 109 corresponds to an optical filter in the camera 124, and a solid-state image pickup element (photoelectric transducer) 110 includes a CCD sensor and a CMOS sensor, and receives light of a subject image which has been formed by the zoom lens 101. In addition, CPUs 111 and 122 control various drivings of the camera 124 and the zoom lens 101.

Thus, the zoom lens of the present invention is applied to a television camera, and thereby an image pickup apparatus having a high optical performance is achieved.

Embodiments of the present invention have been described above, but it is needless to say that the present invention is not limited to these embodiments, and can be modified and changed in various ways in such a range as not to deviate from the scope.

Numerical Embodiments 1 to 5 will be described below which correspond to Embodiments 1 to 5 of the present invention respectively. In each numerical embodiment, i represents an order of a surface (optical surface and lens surface) from the object side. ri represents a radius of curvature of the i-th surface from the object side, di represents a space between the i-th surface from the object side and the (i+1)-th surface therefrom, and ndi, νdi and θgFi represent a refractive index, an Abbe constant, and a partial dispersion ratio of a medium (material of optical member and glass material) between the i-th surface and the (i+1)-th surface, respectively. This partial dispersion ratio θg,F is the partial dispersion ratio expressed by the previously described Expression (C). An effective diameter means an effective diameter (maximum light-beam height of effective light beam) on the i-th surface, and a focal length means a focal length of an optical member (lens) which has been arranged between the i-th surface and the (i+1)-th surface. In addition, BF represents an air-equivalent back-focus.

When an optical axis direction is determined to be an X-axis, a direction perpendicular to the optical axis is determined to be an H-axis, a traveling direction of light is determined to be positive, R represents a paraxial radius of curvature, k represents a conic constant, and A4, A6, A8, A10 and A12 each represent an aspherical coefficient, an aspherical surface shape is expressed by the following Expression (I). In addition, "e-Z" means "×10$^{-Z}$".

$$X = \frac{H^2/R}{1 + \sqrt{1 - (1+k)(H/R)^2}} + \\ A4H^4 + A6H^6 + A8H^8 + A10H^{10} + A12H^{12}$$ (I)

Numerical Embodiment 1

Unit mm

Surface data

| i-th surface | ri | di | ndi | ν di | θgFi | Effective diameter | Focal length |
|---|---|---|---|---|---|---|---|
| 1 | 98.70007 | 2.50000 | 1.772499 | 49.60 | 0.5521 | 75.668 | −55.418 |
| 2 | 29.62727 | 16.26062 | | | | 55.309 | |
| 3 | 64.42910 | 2.00000 | 1.772499 | 49.60 | 0.5521 | 52.747 | −87.740 |
| 4 | 32.65886 | 18.07660 | | | | 47.083 | |
| 5 | −52.68987 | 2.00000 | 1.589130 | 61.14 | 0.5406 | 46.718 | −111.047 |
| 6 | −270.22920 | 1.49474 | | | | 49.520 | |
| 7 | 76.48550 | 5.60617 | 1.922860 | 18.90 | 0.6495 | 55.360 | 117.496 |
| 8 | 243.28386 | 4.02023 | | | | 55.283 | |
| 9 | 4668.02554 | 8.22678 | 1.487490 | 70.23 | 0.5300 | 55.637 | 134.050 |
| 10 | −66.46589 | 5.36022 | | | | 55.818 | |
| 11 | −622.14337 | 2.00000 | 1.846660 | 23.78 | 0.6205 | 52.313 | −51.330 |
| 12 | 47.28994 | 12.39326 | 1.487490 | 70.23 | 0.5300 | 51.310 | 71.424 |
| 13 | −122.23105 | 0.15000 | | | | 51.721 | |
| 14 | 118.96805 | 11.02578 | 1.496999 | 81.54 | 0.5374 | 52.223 | 80.349 |
| 15 | −58.51414 | 0.15000 | | | | 52.037 | |
| 16 | 46.98238 | 4.59503 | 1.772499 | 49.60 | 0.5521 | 43.725 | 99.532 |
| 17 | 114.76830 | (Variable) | | | | 42.814 | |
| 18 | 10396.90306 | 1.20000 | 1.754998 | 52.32 | 0.5476 | 27.090 | −33.265 |
| 19 | 25.16697 | 4.86194 | | | | 23.972 | |
| 20 | −153.43950 | 1.20000 | 1.496999 | 81.54 | 0.5374 | 23.390 | −43.659 |
| 21 | 25.42462 | 5.07329 | 1.784696 | 26.29 | 0.6135 | 24.170 | 31.942 |
| 22 | −4324.64113 | 3.34835 | | | | 24.087 | |
| 23 | −39.81518 | 1.20000 | 1.834000 | 37.16 | 0.5775 | 23.967 | −59.807 |
| 24 | −195.14536 | (Variable) | | | | 24.612 | |
| 25 | 142.25721 | 2.95792 | 1.729157 | 54.68 | 0.5444 | 25.745 | 79.349 |
| 26 | −97.37703 | 0.20000 | | | | 25.921 | |
| 27 | 60.75670 | 5.04520 | 1.496999 | 81.54 | 0.5374 | 25.935 | 49.403 |
| 28 | −40.26471 | 1.40000 | 1.834000 | 37.16 | 0.5775 | 25.718 | −67.044 |
| 29 | −143.79570 | (Variable) | | | | 25.753 | |
| 30 | 0.00000 | 1.39957 | | | | 24.312 | |
| 31 | 85.08699 | 4.36998 | 1.761821 | 26.52 | 0.6135 | 24.020 | 33.919 |
| 32 | −36.74762 | 1.50000 | 1.720467 | 34.70 | 0.5834 | 23.714 | −32.337 |
| 33 | 65.96749 | 10.69231 | | | | 22.734 | |
| 34 | 112.13875 | 1.50000 | 1.834000 | 37.16 | 0.5775 | 21.437 | −79.706 |
| 35 | 41.64594 | 5.81919 | 1.496999 | 81.54 | 0.5374 | 21.070 | 46.821 |
| 36 | −50.62143 | 7.77569 | | | | 20.819 | |
| 37 | 36.34485 | 5.68860 | 1.496999 | 81.54 | 0.5374 | 22.099 | 35.111 |
| 38 | −31.99802 | 1.50000 | 1.834000 | 37.16 | 0.5775 | 21.977 | −19.605 |
| 39 | 34.59932 | 5.00023 | | | | 22.435 | |

Unit mm

| | | | | | | | |
|---|---|---|---|---|---|---|---|
| 40 | 40.76716 | 6.64810 | 1.487490 | 70.23 | 0.5300 | 27.106 | 44.425 |
| 41 | −44.04308 | 40.00000 | | | | 27.669 | |
| Image plane | ∞ | | | | | | |

Aspherical surface data

First surface

K = 0.00000e+000 A 4 = 2.23037e−006 A 6 = −6.41540e−010
A 8 = 4.30245e−013 A10 = −1.45017e−016 A12 = 3.57965e−020

Various data
Zoom ratio 2.86

| | | | |
|---|---|---|---|
| Focal length | 14.00 | 21.00 | 40.00 |
| F-number | 2.80 | 2.80 | 2.80 |
| Angle of field | 48.00 | 36.52 | 21.24 |
| Image height | 15.55 | 15.55 | 15.55 |
| Total lens length | 255.05 | 255.05 | 255.05 |
| BF | 40.00 | 40.00 | 40.00 |
| d17 | 2.31 | 16.93 | 27.94 |
| d24 | 29.18 | 21.91 | 2.34 |
| d29 | 9.32 | 1.97 | 10.53 |
| d41 | 40.00 | 40.00 | 40.00 |
| Incident pupil position | 33.57 | 38.48 | 46.11 |
| Exit pupil position | −70.63 | −70.63 | −70.63 |
| Front principal point position | 45.80 | 55.49 | 71.65 |
| Rear principal point position | 26.00 | 19.00 | −0.00 |

Zoom lens unit data

| Unit | Leading surface | Focal length | Lens structure length | Front principal point position | Rear principal point position |
|---|---|---|---|---|---|
| 1 | 1 | 25.00 | 95.86 | 45.18 | 44.95 |
| 2 | 18 | −24.00 | 16.88 | 4.02 | −7.88 |
| 3 | 25 | 54.82 | 9.60 | 1.06 | −4.98 |
| 4 | 30 | 83.91 | 51.89 | 34.16 | −13.01 |

Numerical Embodiment 2

Unit mm

Surface data

| i-th surface | ri | di | ndi | ν di | θgFi | Effective diameter | Focal length |
|---|---|---|---|---|---|---|---|
| 1 | 95.37749 | 2.85000 | 1.772499 | 49.60 | 0.5521 | 73.040 | −74.678 |
| 2 | 35.58322 | 21.12332 | | | | 58.964 | |
| 3 | −135.55338 | 2.00000 | 1.603001 | 65.44 | 0.5402 | 57.605 | −87.120 |
| 4 | 86.76814 | 7.91957 | | | | 55.937 | |
| 5 | 77.77528 | 5.06125 | 1.922860 | 18.90 | 0.6495 | 59.822 | 143.878 |
| 6 | 178.75533 | 3.55444 | | | | 59.589 | |
| 7 | 307.05210 | 8.69965 | 1.487490 | 70.23 | 0.5300 | 59.662 | 140.139 |
| 8 | −87.42857 | 2.00000 | 1.603001 | 65.44 | 0.5402 | 59.573 | −823.429 |
| 9 | −106.94506 | 9.83103 | | | | 59.607 | |
| 10 | 122.87201 | 5.66234 | 1.522494 | 59.84 | 0.5439 | 56.058 | 196.554 |
| 11 | −630.82928 | 0.20000 | | | | 55.570 | |
| 12 | −945.44474 | 2.00000 | 1.854780 | 24.80 | 0.6123 | 55.380 | −54.080 |
| 13 | 49.13627 | 11.65950 | 1.496999 | 81.54 | 0.5374 | 53.157 | 78.949 |
| 14 | −182.04012 | 0.20000 | | | | 53.222 | |
| 15 | 143.91871 | 5.50000 | 1.522494 | 59.84 | 0.5439 | 52.781 | 181.676 |
| 16 | −278.41578 | 0.20000 | | | | 52.434 | |
| 17 | 90.69667 | 6.85513 | 1.772499 | 49.60 | 0.5521 | 50.435 | 83.076 |
| 18 | −215.74820 | (Variable) | | | | 49.553 | |
| 19 | −668.92717 | 1.20000 | 1.589130 | 61.14 | 0.5406 | 25.946 | −42.061 |
| 20 | 25.85428 | 3.81622 | | | | 22.729 | |
| 21 | −94.64299 | 1.20000 | 1.516330 | 64.14 | 0.5352 | 22.353 | −34.665 |

-continued

| | | | Unit mm | | | | |
|---|---|---|---|---|---|---|---|
| 22 | 22.27025 | 3.79165 | 1.755199 | 27.51 | 0.6103 | 20.739 | 32.605 |
| 23 | 199.79852 | 2.20808 | | | | 20.275 | |
| 24 | −36.14348 | 1.20000 | 1.589130 | 61.14 | 0.5406 | 20.212 | −46.960 |
| 25 | 121.41550 | (Variable) | | | | 20.639 | |
| 26 | 101.78909 | 3.31668 | 1.589130 | 61.14 | 0.5406 | 21.449 | 58.653 |
| 27 | −51.98522 | 0.20000 | | | | 21.649 | |
| 28 | 70.23678 | 4.07065 | 1.496999 | 81.54 | 0.5374 | 21.534 | 48.501 |
| 29 | −36.15321 | 1.40000 | 1.834000 | 37.16 | 0.5775 | 21.308 | −41.040 |
| 30 | 742.15054 | (Variable) | | | | 21.317 | |
| 31 | 0.00000 | 0.60000 | | | | 21.403 | |
| 32 | 41.82457 | 3.42297 | 1.805181 | 25.42 | 0.6161 | 21.461 | 178.794 |
| 33 | 56.57582 | 16.10179 | | | | 20.804 | |
| 34 | −435.74567 | 2.00000 | 1.728250 | 28.46 | 0.6077 | 20.779 | 173.533 |
| 35 | −98.78372 | 7.42400 | | | | 21.117 | |
| 36 | 114.89137 | 4.85546 | 1.496999 | 81.54 | 0.5374 | 22.985 | 74.385 |
| 37 | −53.97500 | 1.47600 | | | | 23.218 | |
| 38 | −48.01088 | 1.70000 | 1.882997 | 40.76 | 0.5667 | 23.079 | −21.363 |
| 39 | 31.89250 | 7.70000 | 1.496999 | 81.54 | 0.5374 | 24.045 | 38.448 |
| 40 | −44.16514 | 7.01362 | | | | 25.639 | |
| 41 | 40.85638 | 4.00000 | 1.487490 | 70.23 | 0.5300 | 30.278 | 92.886 |
| 42 | 392.40877 | 50.00000 | | | | 30.259 | |
| Image plane | ∞ | | | | | | |

Aspherical surface data

First surface

K = 0.00000e+000 A 4 = 3.89702e−007 A 6 = 2.32971e−010
A 8 = −1.16421e−013 A10 = 7.10643e−017 A12 = −1.36430e−020

Various data
Zoom ratio 4.00

| | | | |
|---|---|---|---|
| Focal length | 20.00 | 40.00 | 80.00 |
| F-number | 3.50 | 3.50 | 3.50 |
| Angle of field | 37.87 | 25.24 | 11.00 |
| Image height | 15.55 | 15.55 | 15.55 |
| Total lens length | 270.03 | 270.03 | 270.03 |
| BF | 50.00 | 50.00 | 50.00 |
| d18 | 0.90 | 23.99 | 36.00 |
| d25 | 29.74 | 20.73 | 1.91 |
| d30 | 15.38 | 1.30 | 8.11 |
| d42 | 50.00 | 50.00 | 50.00 |
| Incident pupil position | 46.62 | 65.95 | 90.07 |
| Exit pupil position | −88.75 | −88.75 | −88.75 |
| Front principal point position | 63.74 | 94.42 | 123.94 |
| Rear principal point position | 30.00 | 10.00 | −30.00 |

Zoom lens unit data

| Unit | Leading surface | Focal length | Lens structure length | Front principal point position | Rear principal point position |
|---|---|---|---|---|---|
| 1 | 1 | 40.00 | 95.32 | 55.87 | 33.55 |
| 2 | 19 | −21.00 | 13.42 | 4.71 | −4.88 |
| 3 | 26 | 69.72 | 8.99 | −0.88 | −6.45 |
| 4 | 31 | 70.29 | 56.29 | 32.99 | −26.58 |

Numerical Embodiment 3

| | | | Unit mm | | | | |
|---|---|---|---|---|---|---|---|
| i-th surface | ri | di | ndi | ν di | θgFi | Effective diameter | Focal length |
| 1 | 152.53568 | 2.50000 | 1.804000 | 46.57 | 0.5572 | 80.282 | −53.079 |
| 2 | 33.23387 | 21.92204 | | | | 59.405 | |
| 3 | −294.65548 | 1.80000 | 1.593490 | 67.00 | 0.5361 | 57.578 | −114.469 |
| 4 | 88.90575 | 2.00000 | | | | 54.488 | |

-continued

| | | | Unit mm | | | | |
|---|---|---|---|---|---|---|---|
| 5 | 114.88268 | 1.80000 | 1.593490 | 67.00 | 0.5361 | 54.217 | −147.616 |
| 6 | 49.51362 | 8.00000 | | | | 52.219 | |
| 7 | 59.30182 | 5.18614 | 1.717362 | 29.50 | 0.6048 | 55.758 | 180.255 |
| 8 | 104.81202 | 5.00000 | | | | 55.421 | |
| 9 | 445.83966 | 7.89573 | 1.487490 | 70.23 | 0.5300 | 55.741 | 139.973 |
| 10 | −80.41913 | 4.41178 | | | | 55.963 | |
| 11 | 64.95869 | 1.80000 | 1.854780 | 24.80 | 0.6123 | 52.805 | −90.181 |
| 12 | 34.95003 | 11.85352 | 1.438750 | 94.93 | 0.5343 | 49.480 | 82.937 |
| 13 | 746.93180 | 0.20000 | | | | 49.289 | |
| 14 | 83.43049 | 5.15893 | 1.496999 | 81.54 | 0.5374 | 49.038 | 195.252 |
| 15 | 572.40587 | 0.40000 | | | | 48.541 | |
| 16 | 59.12257 | 8.94584 | 1.589130 | 61.14 | 0.5406 | 46.956 | 65.899 |
| 17 | −107.93626 | (Variable) | | | | 46.120 | |
| 18 | −128.13466 | 1.20000 | 1.593490 | 67.00 | 0.5361 | 24.216 | −27.257 |
| 19 | 18.65497 | 5.50351 | | | | 20.301 | |
| 20 | −35.09497 | 1.20000 | 1.438750 | 94.93 | 0.5343 | 19.685 | −65.818 |
| 21 | 167.08316 | 0.50000 | | | | 19.147 | |
| 22 | 37.48125 | 1.20000 | 1.438750 | 94.93 | 0.5343 | 19.154 | −242.074 |
| 23 | 27.45145 | 2.40000 | 1.805181 | 25.42 | 0.6161 | 19.510 | 66.279 |
| 24 | 53.79181 | (Variable) | | | | 19.512 | |
| 25 | 206.54541 | 1.40000 | 1.834000 | 37.16 | 0.5775 | 20.368 | −35.677 |
| 26 | 26.07217 | 4.84231 | 1.516330 | 64.14 | 0.5352 | 20.777 | 41.351 |
| 27 | −112.73214 | 0.20000 | | | | 21.534 | |
| 28 | 41.61518 | 3.09620 | 1.772499 | 49.60 | 0.5521 | 22.515 | 52.141 |
| 29 | −1425.61456 | (Variable) | | | | 22.493 | |
| 30 | 0.00000 | 3.72814 | | | | 22.121 | |
| 31 | 225.14682 | 3.37315 | 1.922860 | 18.90 | 0.6495 | 21.968 | 56.265 |
| 32 | −68.08410 | 10.00000 | | | | 21.819 | |
| 33 | −43.28566 | 1.50000 | 1.717362 | 29.50 | 0.6048 | 17.553 | −18.742 |
| 34 | 20.01622 | 11.34310 | 1.487490 | 70.23 | 0.5300 | 18.952 | 26.813 |
| 35 | −30.96172 | 1.90000 | | | | 22.682 | |
| 36 | −56.43218 | 6.91739 | 1.438750 | 94.93 | 0.5343 | 23.890 | 56.279 |
| 37 | −17.85101 | 1.23556 | | | | 25.192 | |
| 38 | −17.30817 | 1.50000 | 1.903660 | 31.32 | 0.5946 | 24.955 | −42.729 |
| 39 | −32.46779 | 2.00000 | | | | 27.878 | |
| 40 | 311.10406 | 9.97254 | 1.487490 | 70.23 | 0.5300 | 31.552 | 40.795 |
| 41 | −21.09811 | 2.00000 | 1.720467 | 34.70 | 0.5834 | 32.350 | −164.979 |
| 42 | −26.63455 | 40.00000 | | | | 34.377 | |
| Image plane | ∞ | | | | | | |

Aspherical surface data

First surface $K = 0.00000e+000\ A\ 4 = 1.97535e-006\ A\ 6 = -5.16188e-010$
$A\ 8 = 1.49560e-013\ A10 = 2.03100e-018\ A12 = -3.19604e-021$ Tenth surface $K = 0.00000e+000\ A\ 4 = 2.31269e-007\ A\ 6 = -5.03317e-010$
$A\ 8 = 8.88759e-013\ A10 = -1.17437e-015\ A12 = 5.19762e-019$ Various data
Zoom ratio 2.29

| | | | |
|---|---|---|---|
| Focal length | 14.00 | 21.00 | 32.00 |
| F-number | 2.70 | 2.70 | 2.70 |
| Angle of field | 48.00 | 36.52 | 25.92 |
| Image height | 15.55 | 15.55 | 15.55 |
| Total lens length | 237.47 | 237.47 | 237.47 |
| BF | 40.00 | 40.00 | 40.00 |
| d17 | 1.60 | 15.72 | 24.91 |
| d24 | 20.32 | 13.40 | 2.72 |
| d29 | 9.66 | 2.46 | 3.95 |
| d42 | 40.00 | 40.00 | 40.00 |
| Incident pupil position | 34.33 | 39.92 | 45.39 |
| Exit pupil position | −159.95 | −159.95 | −159.95 |
| Front principal point position | 47.35 | 58.72 | 72.27 |
| Rear principal point position | 26.00 | 19.00 | 8.00 |

-continued

| Unit mm |
|---|
| Zoom lens unit data |

| Unit | Leading surface | Focal length | Lens structure length | Front principal point position | Rear principal point position |
|---|---|---|---|---|---|
| 1 | 1 | 29.50 | 88.87 | 46.07 | 38.08 |
| 2 | 18 | −23.50 | 12.00 | 1.47 | −7.97 |
| 3 | 25 | 62.00 | 9.54 | 5.58 | −0.21 |
| 4 | 30 | 59.53 | 55.47 | 42.41 | −12.50 |

Numerical Embodiment 4

| Unit mm |
|---|
| Surface data |

| i-th surface | ri | di | ndi | ν di | θgFi | Effective diameter | Focal length |
|---|---|---|---|---|---|---|---|
| 1 | 94.01569 | 3.00000 | 1.772499 | 49.60 | 0.5521 | 77.416 | −64.097 |
| 2 | 32.08149 | 22.00000 | | | | 58.011 | |
| 3 | −207.77558 | 2.00000 | 1.603001 | 65.44 | 0.5402 | 56.619 | −111.778 |
| 4 | 100.67023 | 7.21946 | | | | 53.815 | |
| 5 | 817.07836 | 2.00000 | 1.772499 | 49.60 | 0.5521 | 52.784 | −54.284 |
| 6 | 40.02651 | 10.08909 | 1.805181 | 25.42 | 0.6161 | 52.214 | 62.910 |
| 7 | 163.57064 | 6.32372 | | | | 52.102 | |
| 8 | 559.20079 | 6.80390 | 1.487490 | 70.23 | 0.5300 | 53.467 | 176.086 |
| 9 | −101.40751 | 7.90856 | | | | 53.946 | |
| 10 | −2809.53668 | 2.00000 | 1.846660 | 23.78 | 0.6205 | 54.131 | −78.103 |
| 11 | 68.42954 | 12.08338 | 1.496999 | 81.54 | 0.5374 | 54.267 | 79.502 |
| 12 | −88.62346 | 0.20000 | | | | 54.843 | |
| 13 | 99.15962 | 13.71608 | 1.496999 | 81.54 | 0.5374 | 56.295 | 79.528 |
| 14 | −63.00426 | 0.40000 | | | | 56.032 | |
| 15 | 41.69430 | 5.86717 | 1.589130 | 61.14 | 0.5406 | 45.970 | 127.480 |
| 16 | 88.39957 | (Variable) | | | | 44.309 | |
| 17 | 144.26656 | 1.20000 | 1.804000 | 46.58 | 0.5572 | 23.753 | −36.258 |
| 18 | 24.26363 | 4.83826 | | | | 21.154 | |
| 19 | −40.33718 | 1.20000 | 1.487490 | 70.23 | 0.5300 | 20.359 | −49.702 |
| 20 | 61.79067 | 1.52410 | | | | 19.786 | |
| 21 | 40.37278 | 4.34628 | 1.846660 | 23.78 | 0.6205 | 20.693 | 33.327 |
| 22 | −92.05632 | 1.34578 | | | | 20.643 | |
| 23 | −36.54169 | 1.20000 | 1.804000 | 46.58 | 0.5572 | 20.537 | −35.691 |
| 24 | 138.88755 | (Variable) | | | | 20.948 | |
| 25 | 146.27770 | 1.40000 | 1.903660 | 31.32 | 0.5946 | 22.024 | −39.950 |
| 26 | 28.99740 | 4.29574 | 1.589130 | 61.14 | 0.5406 | 22.418 | 41.600 |
| 27 | −153.41661 | 0.20000 | | | | 22.946 | |
| 28 | 53.39657 | 3.72996 | 1.772499 | 49.60 | 0.5521 | 23.803 | 53.948 |
| 29 | −188.14663 | (Variable) | | | | 23.871 | |
| 30 | 0.00000 | 12.28693 | | | | 23.315 | |
| 31 | 144.07385 | 5.38869 | 1.846660 | 23.78 | 0.6205 | 22.818 | 21.454 |
| 32 | −20.65754 | 1.50000 | 1.805181 | 25.42 | 0.6161 | 22.672 | −34.574 |
| 33 | −80.56591 | 6.52360 | | | | 22.142 | |
| 34 | −51.86512 | 1.50000 | 1.834000 | 37.16 | 0.5775 | 22.082 | −26.273 |
| 35 | 38.86937 | 5.88641 | 1.496999 | 81.54 | 0.5374 | 22.935 | 38.444 |
| 36 | −35.89185 | 2.00000 | | | | 23.770 | |
| 37 | 52.22724 | 6.35382 | 1.496999 | 81.54 | 0.5374 | 25.117 | 38.707 |
| 38 | −29.35900 | 1.50000 | 1.903660 | 31.32 | 0.5946 | 25.103 | −28.238 |
| 39 | 211.87275 | 1.00000 | | | | 26.024 | |
| 40 | 93.27227 | 4.80621 | 1.487490 | 70.23 | 0.5300 | 26.810 | 69.385 |
| 41 | −52.45002 | 46.11000 | | | | 27.274 | |
| Image plane | ∞ | | | | | | |

| Aspherical surface data |
|---|

First surface

K = 0.00000e+000 A 4 = 1.07564e−006 A 6 = −4.49925e−011
A 8 = −2.37866e−017 A10 = 2.77096e−017 A12 = −4.33307e−021

| Unit mm |||||
|---|---|---|---|---|
| Various data Zoom ratio 3.00 |||||
| Focal length | 15.00 | 30.00 | 45.00 ||
| F-number | 3.00 | 3.00 | 3.00 ||
| Angle of field | 46.03 | 27.40 | 19.06 ||
| Image height | 15.55 | 15.55 | 15.55 ||
| Total lens length | 260.00 | 260.00 | 260.00 ||
| BF | 46.11 | 46.11 | 46.11 ||
| d16 | 2.00 | 24.44 | 31.42 ||
| d24 | 21.58 | 11.69 | 2.02 ||
| d29 | 14.68 | 2.12 | 4.81 ||
| d41 | 46.11 | 46.11 | 46.11 ||
| Incident pupil position | 38.65 | 49.53 | 55.90 ||
| Exit pupil position | −52.86 | −52.86 | −52.86 ||
| Front principal point position | 51.38 | 70.44 | 80.44 ||
| Rear principal point position | 31.11 | 16.11 | 1.11 ||

Zoom lens unit data

| Unit | Leading surface | Focal length | Lens structure length | Front principal point position | Rear principal point position |
|---|---|---|---|---|---|
| 1 | 1 | 29.00 | 101.61 | 50.54 | 41.13 |
| 2 | 17 | −20.40 | 15.65 | 4.08 | −6.95 |
| 3 | 25 | 56.00 | 9.63 | 4.57 | −1.16 |
| 4 | 30 | 74.63 | 48.75 | 23.69 | −18.16 |

Numerical Embodiment 5

Unit mm

Surface data

| i-th surface | ri | di | ndi | ν di | θgFi | Effective diameter | Focal length |
|---|---|---|---|---|---|---|---|
| 1 | 52.03526 | 2.50000 | 1.772499 | 49.60 | 0.5521 | 72.165 | −103.482 |
| 2 | 30.91519 | 12.72231 | | | | 57.489 | |
| 3 | 56.78526 | 2.20000 | 1.772499 | 49.60 | 0.5521 | 55.715 | −92.046 |
| 4 | 31.10328 | 20.06776 | | | | 49.329 | |
| 5 | −58.90814 | 2.10000 | 1.593490 | 67.00 | 0.5361 | 48.217 | −65.836 |
| 6 | 118.84418 | 1.50259 | | | | 50.639 | |
| 7 | 72.50844 | 5.66826 | 1.959060 | 17.47 | 0.6599 | 54.127 | 106.315 |
| 8 | 233.74364 | 2.03720 | | | | 54.075 | |
| 9 | 181.50422 | 9.05500 | 1.487490 | 70.23 | 0.5300 | 54.520 | 112.003 |
| 10 | −77.18651 | 5.73530 | | | | 54.641 | |
| 11 | −238.79291 | 2.00000 | 1.846660 | 23.78 | 0.6205 | 52.116 | −47.476 |
| 12 | 49.09709 | 13.19266 | 1.487490 | 70.23 | 0.5300 | 51.656 | 67.823 |
| 13 | −93.27330 | 0.15000 | | | | 52.215 | |
| 14 | 126.45563 | 11.28826 | 1.496999 | 81.54 | 0.5374 | 53.230 | 81.671 |
| 15 | −58.25396 | 0.15000 | | | | 53.286 | |
| 16 | 48.43648 | 5.18177 | 1.772499 | 49.60 | 0.5521 | 46.721 | 101.961 |
| 17 | 119.00436 | (Variable) | | | | 45.663 | |
| 18 | 2100.98746 | 1.30000 | 1.754998 | 52.32 | 0.5476 | 25.729 | −34.340 |
| 19 | 25.71887 | 4.21166 | | | | 22.826 | |
| 20 | −82.77358 | 1.30000 | 1.496999 | 81.54 | 0.5374 | 22.390 | −36.281 |
| 21 | 23.26064 | 4.69237 | 1.784696 | 26.29 | 0.6135 | 22.298 | 26.279 |
| 22 | −179.55623 | 2.18844 | | | | 22.215 | |
| 23 | −35.50225 | 1.30000 | 1.834000 | 37.16 | 0.5775 | 22.061 | −36.647 |
| 24 | 234.07171 | (Variable) | | | | 22.696 | |
| 25 | 283.65678 | 3.83014 | 1.729157 | 54.68 | 0.5444 | 24.054 | 56.975 |
| 26 | −48.64182 | 0.40000 | | | | 24.485 | |
| 27 | 50.21870 | 5.08486 | 1.496999 | 81.54 | 0.5374 | 24.462 | 43.668 |
| 28 | −37.12502 | 1.50000 | 1.834000 | 37.16 | 0.5775 | 24.199 | −44.180 |
| 29 | 32003.74846 | (Variable) | | | | 24.169 | |
| 30 | 0.00000 | 7.92560 | | | | 24.082 | |
| 31 | 158.65366 | 4.81128 | 1.496999 | 81.54 | 0.5374 | 23.958 | 72.289 |
| 32 | −46.15062 | 2.43824 | | | | 23.789 | |

-continued

Unit mm

| | | | | | | | |
|---|---|---|---|---|---|---|---|
| 33 | −218.24820 | 4.38390 | 1.808095 | 22.76 | 0.6307 | 22.413 | 34.979 |
| 34 | −25.48127 | 1.20000 | 1.903660 | 31.32 | 0.5946 | 22.080 | −28.530 |
| 35 | −1368.46311 | 15.21655 | | | | 21.721 | |
| 36 | −32.05668 | 3.05673 | 1.496999 | 81.54 | 0.5374 | 23.692 | 393.010 |
| 37 | −28.42244 | 0.19984 | | | | 24.870 | |
| 38 | 118.55807 | 6.60300 | 1.438750 | 94.93 | 0.5343 | 25.802 | 50.452 |
| 39 | −26.83710 | 1.20000 | 2.000690 | 25.46 | 0.6133 | 26.061 | −49.245 |
| 40 | −59.59977 | 0.68800 | | | | 27.194 | |
| 41 | 335.70340 | 4.13228 | 1.487490 | 70.23 | 0.5300 | 27.923 | 127.381 |
| 42 | −76.19887 | 45.38000 | | | | 28.332 | |
| Image plane | ∞ | | | | | | |

Aspherical surface data

Third surface

K = 0.00000e+000 A 4 = 1.72134e−006 A 6 = 1.57275e−009
A 8 = −1.96194e−013 A10 = −4.85686e−017 A12 = 8.85842e−019

Tenth surface

K = 0.00000e+000 A 4 = 3.04914e−007 A 6 = 2.52809e−012
A 8 = −2.08997e−013 A10 = −2.68841e−016 A12 = 2.73790e−019

Various data
Zoom ratio 3.03

| | | | |
|---|---|---|---|
| Focal length | 16.50 | 25.00 | 50.00 |
| F-number | 2.80 | 2.80 | 2.80 |
| Angle of field | 43.30 | 31.88 | 17.28 |
| Image height | 15.55 | 15.55 | 15.55 |
| Total lens length | 260.93 | 260.93 | 260.93 |
| BF | 45.38 | 45.38 | 45.38 |
| d17 | 2.51 | 19.44 | 35.17 |
| d24 | 20.04 | 15.62 | 2.78 |
| d29 | 18.40 | 5.89 | 3.00 |
| d42 | 45.38 | 45.38 | 45.38 |
| Incident pupil position | 41.30 | 48.56 | 61.97 |
| Exit pupil position | −75.12 | −75.12 | −75.12 |
| Front principal point position | 55.54 | 68.38 | 91.22 |
| Rear principal point position | 28.88 | 20.38 | −4.62 |

Zoom lens unit data

| Unit | Leading surface | Focal length | Lens structure length | Front principal point position | Rear principal point position |
|---|---|---|---|---|---|
| 1 | 1 | 32.00 | 95.19 | 53.77 | 44.49 |
| 2 | 18 | −20.00 | 16.23 | 5.70 | −5.44 |
| 3 | 25 | 50.34 | 11.40 | −0.17 | −7.04 |
| 4 | 30 | 67.58 | 51.79 | 31.32 | −16.76 |

The values corresponding to each conditional expression in each numerical embodiment are shown in Table 1.

TABLE 1

| Conditional expression | Numerical Embodiment | | | | |
|---|---|---|---|---|---|
| | 1 | 2 | 3 | 4 | 5 |
| (1) f1/f2 | −1.04 | −1.90 | −1.26 | −1.42 | −1.60 |
| (2) 1/β3w | −0.40 | 0.08 | −0.14 | −0.13 | −0.06 |
| (3) f2/f3 | −0.46 | −0.30 | −0.38 | −0.36 | −0.40 |
| (4) f12/f11 | −4.38 | −3.05 | −4.53 | −5.85 | −3.39 |
| (5) f11/f1 | −1.20 | −1.39 | −1.05 | −1.04 | −1.03 |
| (6) f13/f1 | 2.02 | 1.47 | 1.69 | 1.60 | 1.64 |
| (7) f11n/f11 | 0.69 | 0.64 | 0.77 | 0.58 | 0.67 |
| (8) f11p/f11 | −4.28 | −2.58 | −5.84 | −2.09 | −3.27 |
| (9) f12/f1 | 5.25 | 4.25 | 4.74 | 6.07 | 3.49 |
| (10) ν12 | 70.2 | 67.8 | 70.2 | 70.2 | 70.2 |
| (11) ft/f1 | 1.60 | 2.00 | 1.08 | 1.55 | 1.56 |

TABLE 1-continued

| Conditional expression | Numerical Embodiment | | | | |
|---|---|---|---|---|---|
|  | 1 | 2 | 3 | 4 | 5 |
| (12) νfn − νfp | 34.6 | 38.6 | 30.7 | 29.5 | 37.9 |
| (13) ννn − ννp | 55.3 | 36.6 | 69.5 | 46.5 | 58.3 |
| (14) (θνp − θνn)/(ννp − ννn) | −1.38E−03 | −2.05E−03 | −1.18E−03 | −1.95E−03 | −1.38E−03 |
| (15) ft/fw | 2.86 | 4.00 | 2.29 | 3.00 | 3.03 |
| (16) ωw | 48.0 | 37.9 | 48.0 | 46.0 | 43.3 |

The present invention relates to a zoom lens and an image pickup apparatus having the same, and particularly relates to a broadcasting television camera, a cinema camera, a video camera, a digital still camera, a silver halide film camera and the like.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2012-092310, filed Apr. 13, 2012, which is hereby incorporated by reference herein in its entirety.

What is claimed is:

1. A zoom lens comprising, in order from an object side:
a first lens unit having a positive refractive power, which does not move for varying magnification; a second lens unit having a negative refractive power, which moves during varying magnification; a third lens unit having a positive refractive power, which moves during varying magnification; and a fourth lens unit having a positive refractive power, which does not move for varying magnification, wherein
the first lens unit comprises, in order from the object side, a first lens subunit having a negative refractive power, which does not move for focusing, a second lens subunit having a positive refractive power, which moves during focusing, and a third lens subunit having a positive refractive power, which does not move for focusing;
the third lens unit forms such a locus as to move toward an image side during varying magnification toward a telephoto end from a wide angle end and then move toward the object side; and
the following expressions are satisfied:

$-2.2 < f1/f2 < -0.8$, $-0.7 < 1/\beta 3w < 0.5$, $-0.55 < f2/f3 < -0.25$, and $-6.0 < f12/f11 < -2.5$, where f1 represents a focal length of the first lens unit, f2 represents a focal length of the second lens unit, f3 represents a focal length of the third lens unit, β3w represents a magnification of the third lens unit at the wide angle end, f11 represents a focal length of the first lens subunit and f12 represents a focal length of the second lens subunit.

2. The zoom lens according to claim 1, wherein the following expression is satisfied:

$-1.5 < f11/f1 < -0.8$.

3. The zoom lens according to claim 1, wherein the following expression is satisfied:

$1.4 < f13/f1 < 2.6$, where f13 represents a focal length of the third lens subunit.

4. The zoom lens according to claim 1, wherein the first lens subunit has one or more lenses having a positive refractive power and one or more lenses having a negative refractive power, and the following expressions are satisfied:

$0.50 < f11n/f11 < 0.85$, and $-6.0 < f11p/f11 < -1.5$, where f11n represents a combined focal length of the lenses having the negative refractive power in the first lens subunit, f11p represents a combined focal length of the lenses having the positive refractive power in the first lens subunit.

5. The zoom lens according to claim 1, wherein the following expressions are satisfied:

$3.0 < f12/f1 < 7.0$, and $60 < \nu 12$, where f12 represents the focal length of the second lens subunit and ν12 represents an average Abbe constant of an optical material to be used in the second lens subunit.

6. The zoom lens according to claim 1, wherein the following expressions are satisfied:

$1.0 < ft/f1 < 2.2$, and $20.0 < \nu fn - \nu fp < 45.0$, where ft represents a focal length of the whole system of the zoom lens at a telephoto end, νfn represents an average value of an Abbe constant of a glass material of the lens having the negative refractive power, which is included in the first lens subunit, and νfp represents an average value of an Abbe constant of a glass material of the lens having the positive refractive power, which is included in the first lens subunit.

7. The zoom lens according to claim 1, wherein the following expressions are satisfied:

$35.0 < \nu\nu n - \nu\nu p < 75.0$, and $-2.2 \times 10^{-3} < (\theta\nu p - \theta\nu n)/(\nu\nu n - \nu\nu p) < -1.0 \times 10^{-3}$, where ννn represents the maximum value of an Abbe constant of glass materials of negative lenses included in the second lens unit U2 of the zoom lens, θνn represents a partial dispersion ratio of the glass material of negative lenses included in the second lens unit U2 of the zoom lens, ννp represents the minimum value of an Abbe constant of glass materials of positive lenses included in the second lens unit, and θνp represents a partial dispersion ratio of the glass materials of positive lenses included in the second lens unit.

8. The zoom lens according to claim 1, wherein the third lens unit of the zoom lens comprises, in order from the object side: a lens having a negative refractive power; a lens having a positive refractive power; and a lens having a positive refractive power.

9. The zoom lens according to claim 1, wherein
the first lens subunit or the second lens subunit of the zoom lens has a lens having an aspherical surface on one or more surfaces of the lens.

10. The image pickup apparatus according to claim 9, wherein the following expressions are satisfied:

$$1.5 < ft/fw < 5.0, \text{ and}$$

$$37.0 < \omega w < 50.0,$$

where ωw represents a photographing angle of field of the zoom lens at the wide angle end, fw represents a focal length of the whole system at the wide angle end, and ft represents a focal length of the whole system at the telephoto end.

11. An image pickup apparatus comprising a zoom lens and a solid-state image pickup element which receives light of an image formed by the zoom lens,
wherein the zoom lens comprising, in order from an object side:
a first lens unit having a positive refractive power, which does not move for varying magnification; a second lens unit having a negative refractive power, which moves during varying magnification; a third lens unit having a positive refractive power, which moves during varying magnification; and a fourth lens unit having a positive refractive power, which does not move for varying magnification, wherein
the first lens unit comprises, in order from the object side, a first lens subunit having a negative refractive power, which does not move for focusing, a second lens subunit having a positive refractive power, which moves during focusing, and a third lens subunit having a positive refractive power, which does not move for focusing;
the third lens unit forms such a locus as to move toward an image side during varying magnification toward a telephoto end from a wide angle end and then move toward the object side; and
the following expressions are satisfied:

$$-2.2 < f1/f2 < -0.8,$$

$$-0.7 < 1/\beta 3w < 0.5,$$

$$-0.55 < f2/f3 < -0.25, \text{ and}$$

$$-6.0 < f12/f11 < -2.5,$$

where f1 represents a focal length of the first lens unit, f2 represents a focal length of the second lens unit, f3 represents a focal length of the third lens unit, β3w represents a magnification of the third lens unit at the wide angle end, f11 represents a focal length of the first lens subunit and f12 represents a focal length of the second lens subunit.

* * * * *